US010414834B2

(12) United States Patent
Motoda et al.

(10) Patent No.: US 10,414,834 B2
(45) Date of Patent: Sep. 17, 2019

(54) MODIFIED LIQUID DIENE RUBBER AND RESIN COMPOSITION CONTAINING MODIFIED LIQUID DIENE RUBBER

(71) Applicant: KURARAY CO., LTD., Kurashiki-shi (JP)

(72) Inventors: Satoshi Motoda, Kamisu (JP); Kei Hirata, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/538,076

(22) PCT Filed: Dec. 22, 2015

(86) PCT No.: PCT/JP2015/085770
§ 371 (c)(1),
(2) Date: Jun. 20, 2017

(87) PCT Pub. No.: WO2016/104473
PCT Pub. Date: Jun. 30, 2016

(65) Prior Publication Data
US 2018/0022835 A1    Jan. 25, 2018

(30) Foreign Application Priority Data

Dec. 25, 2014 (JP) ................................. 2014-262448
Oct. 29, 2015 (JP) ................................. 2015-213215

(51) Int. Cl.
| | |
|---|---|
| C08C 19/02 | (2006.01) |
| C08C 19/28 | (2006.01) |
| C08F 36/06 | (2006.01) |
| C08F 36/08 | (2006.01) |
| C08F 290/12 | (2006.01) |
| C09J 4/06 | (2006.01) |
| C09J 11/06 | (2006.01) |
| C09J 109/00 | (2006.01) |

(52) U.S. Cl.
CPC .............. *C08C 19/02* (2013.01); *C08C 19/28* (2013.01); *C08F 36/06* (2013.01); *C08F 36/08* (2013.01); *C08F 290/12* (2013.01); *C09J 4/06* (2013.01); *C09J 11/06* (2013.01); *C09J 109/00* (2013.01); *C08F 2500/02* (2013.01); *C08F 2500/04* (2013.01)

(58) Field of Classification Search
CPC ......... C08C 19/02; C08C 19/28; C08F 36/06; C08F 36/08; C08F 290/12; C08F 2500/02; C08F 2500/04; C09J 4/06; C09J 11/06; C09J 109/00
USPC ....................................................... 524/525
See application file for complete search history.

(56) References Cited

U.S. PATENT DOCUMENTS

| | | |
|---|---|---|
| 5,135,984 A | 8/1992 | Kinosada et al. |
| 6,664,318 B1 | 12/2003 | Bymark et al. |
| 2006/0142507 A1 | 6/2006 | Hirata et al. |
| 2010/0076107 A1 | 3/2010 | Kitano et al. |
| 2013/0165586 A1 | 6/2013 | Hashimoto |
| 2015/0050432 A1 | 2/2015 | Ooga et al. |
| 2015/0102090 A1 | 4/2015 | Arai et al. |
| 2016/0229927 A1 | 8/2016 | Motoda et al. |

FOREIGN PATENT DOCUMENTS

| | | |
|---|---|---|
| CN | 1745138 A | 3/2006 |
| CN | 103459445 A | 12/2013 |
| CN | 104093800 A | 10/2014 |
| EP | 0 153 520 A1 | 9/1985 |
| EP | 0 874 027 A2 | 10/1998 |
| EP | 0 874 027 A3 | 10/1998 |
| EP | 2 395 596 A1 | 12/2011 |
| JP | 62-280204 A | 12/1987 |
| JP | 1-113417 A | 5/1989 |
| JP | 2-69545 A | 3/1990 |
| JP | 2003-192750 A | 7/2003 |
| JP | 2003-335985 A | 11/2003 |
| JP | 2003335985 A * | 11/2003 |
| JP | 2008-195790 A | 8/2008 |
| JP | 2009-29976 A | 2/2009 |
| JP | 2011-236297 A | 11/2011 |
| JP | 5451240 B2 | 3/2014 |
| JP | 5507698 B2 | 5/2014 |
| WO | WO 2013/137200 A1 | 9/2013 |
| WO | WO 2013/146015 A1 | 10/2013 |
| WO | 2015/083608 A1 | 6/2015 |

OTHER PUBLICATIONS

JP2003-335985A—machine translation (Year: 2003).*
International Search Report dated Mar. 29, 2016 in PCT/JP2015/085770 filed Dec. 22, 2015.
Combined Office Action and Search Report dated Apr. 11, 2018 in Chinese Patent Application No. 201580070835.7 with English translation of categories of cited documents, 7 pages.

(Continued)

*Primary Examiner* — Ronald Grinsted
(74) *Attorney, Agent, or Firm* — Oblon, McClelland, Maier & Neustadt, L.L.P.

(57) ABSTRACT

There are provided a modified liquid diene rubber that can be used for a curable resin composition and a resin composition containing the modified liquid diene rubber. The curable resin composition containing the modified liquid diene rubber has a much higher curing rate than that in the related art, and the resulting cured product has excellent mechanical properties, transparency, and heat resistance. Produced are a modified liquid diene rubber and a resin composition containing the modified liquid diene rubber. The modified liquid diene rubber includes a modifying group (p) partly containing a (meth)acryloyl group therein and a monomer unit (a1) derived from a conjugated diene compound. A carbon-carbon double bond derived from the conjugated diene compound has a hydrogenation rate of 30 to 95 mol %, and the modifying group (p) has a functional group equivalent weight of 700 to 20,000 g/eq.

8 Claims, No Drawings

(56) References Cited

OTHER PUBLICATIONS

Extended European Search Report dated Aug. 6, 2018 in Patent Application No. 15873041.6, 9 pages.
"Kuraray Liquid Rubber" Kuraray Catalog, Jan. 1, 2007, XP055193303, 7 Pages.

* cited by examiner

MODIFIED LIQUID DIENE RUBBER AND RESIN COMPOSITION CONTAINING MODIFIED LIQUID DIENE RUBBER

TECHNICAL FIELD

The present invention relates to a modified liquid diene rubber having an acryloyl group or a methacryloyl group and a resin composition containing the modified liquid diene rubber.

BACKGROUND ART

From the viewpoints of, for example, controlling organic solvent emission and reducing the amount of energy used in the production process, curable resin compositions containing a polar monomer such as an acrylate or a methacrylate have been regarded as an important technique in various applications such as adhesives, pressure-sensitive adhesives, coating agents, inks, sealing materials, and potting materials. In particular, in the electric and electronic field, downsizing and weight reduction of electric and electronic parts have progressed with development of digital technology. An improvement in performance associated with downsizing and film thinning has been required for the adhesives, pressure-sensitive adhesives, coating agents, sealers, inks, sealing materials, and potting materials used for such parts.

For example, a production process of precision parts such as electric and electronic parts sometimes includes a step of performing heating to 200° C. or higher (e.g., a step of mounting an electronic part on a substrate), and nonoccurrence of cracking and the like is required in such a step. Furthermore, heat is generated when electric and electronic parts are used. Therefore, the above materials are required to have not only flexibility but also sufficient strength against long-term heat history for the purpose of relaxing a stress generated as a result of thermal expansion of a substrate by using a sealing layer, an adhesive layer, or the like. In addition, adhesives and coating agents for optical materials are required to have high transparency.

Cured products satisfying such strength, transparency, and the like can be produced by employing a known technique relating to a curable resin composition obtained by adding a low-molecular-weight diene polymer having a methacryloyl group or an acryloyl group to a methacrylate or an acrylate (e.g., refer to PTL 1 and PTL 2). A technique relating to a photocurable resin composition containing a terminally functionalized hydrogenated polybutadiene is also known (refer to PTL 3 and PTL 4).

Such a curable resin composition is excellent in terms of producing a cured product having, for example, high flexibility, moistureproofness, waterproofness, and transparency. However, resin compositions having a higher curing rate and better workability have been required in recent years, and there has been a room for further improvement.

CITATION LIST

Patent Literature

PTL 1: JPA 2003-192750
PTL 2: JPA 2009-029976
PTL 3: JPB 5451240
PTL 4: JPB 5507698

SUMMARY OF INVENTION

Technical Problem

In view of the foregoing, the present invention provides a modified liquid diene rubber and a resin composition containing the modified liquid diene rubber. The modified liquid diene rubber has high compatibility with various monomers, for example, radically polymerizable monomers having a carbon-carbon double bond, such as acrylates and methacrylates, and can be used for a curable resin composition. The curable resin composition containing the modified liquid diene rubber has a much higher curing rate than that in the related art, and a cured product obtained from the resin composition has excellent mechanical properties, transparency, and heat resistance derived from the modified liquid diene rubber.

Solution to Problem

As a result of thorough studies conducted by the present inventors, they have found that a modified liquid diene rubber which has a particular modifying group in a particular range of functional group equivalent weight and in which the hydrogenation rate of a carbon-carbon double bond derived from a conjugated diene compound contained in the modified liquid diene rubber is in a particular range has a very high curing rate and provides a curable resin composition that exhibits good mechanical properties and also high transparency and high heat resistance after curing. Thus, the present inventors have completed the present invention.

That is, the present invention relates to [1] to [8] below.

[1] A modified liquid diene rubber includes a modifying group (p) partly containing a (meth)acryloyl group therein and a monomer unit (a1) derived from a conjugated diene compound, wherein a carbon-carbon double bond derived from the conjugated diene compound has a hydrogenation rate of 30 to 95 mol %, and the modifying group (p) has a functional group equivalent weight of 700 to 20,000 g/eq.

[2] The modified liquid diene rubber according to [1] has a number-average molecular weight of 1,000 to 80,000.

[3] The modified liquid diene rubber according to [1] or [2] has a melt viscosity of 0.1 to 5,000 Pa·s at 38° C.

[4] In the modified liquid diene rubber according to any one of [1] to [3], the modifying group (p) bonds to a polymer main chain.

[5] A resin composition includes a modified liquid diene rubber (A) and a radical polymerization initiator (B), wherein a content of the radical polymerization initiator (B) is 0.1 to 20 mass % relative to a total amount of the resin composition. The modified liquid diene rubber (A) has a modifying group (p) partly containing a (meth)acryloyl group therein and contains a monomer unit (a1) derived from a conjugated diene compound, a carbon-carbon double bond derived from the conjugated diene compound has a hydrogenation rate of 30 to 95 mol %, and the modifying group (p) has a functional group equivalent weight of 700 to 20,000 g/eq.

[6] The resin composition according to [5] further contains a radically polymerizable monomer (C) having a carbon-carbon double bond, wherein a mass ratio [(A)/(C)] of the modified liquid diene rubber (A) to the monomer (C) is 0.01 to 100.

[7] A cured product is obtained by curing the resin composition according to [5] or [6].

[8] An optical adhesive formed of the resin composition according to [5] or [6].

Advantageous Effects of Invention

According to the present invention, there is provided a modified liquid diene rubber that has high compatibility with various monomers, for example, radically polymerizable monomers having a carbon-carbon double bond, such as acrylates and methacrylates, and that can be used for a curable resin composition. The curable resin composition containing the modified liquid diene rubber has a much higher curing rate than that in the related art, and a cured product obtained from the resin composition has excellent mechanical properties (e.g., flexibility and high strength), transparency, and heat resistance derived from the modified liquid diene rubber. There is also provided a resin composition that contains the modified liquid diene rubber, has a much higher curing rate than that in the related art, and is excellent in terms of the above properties.

Therefore, the modified liquid diene rubber according to the present invention and the resin composition containing the modified liquid diene rubber are suitably used in technical fields such as an electric and electronic field and an optical field.

DESCRIPTION OF EMBODIMENTS

Hereafter, the present invention will be described in detail. In this specification, "(meth)acrylate" is a collective term for "acrylate" and "methacrylate", "(meth)acryl" is a collective term for "acryl" and "methacryl", and "(meth)acryloyl" is a collective term for "acryloyl" and "methacryloyl".

[Modified Liquid Diene Rubber (A)]

A modified liquid diene rubber (A) of the present invention has a modifying group (p) partly containing a (meth)acryloyl group therein and contains a monomer unit (a1) derived from a conjugated diene compound. The carbon-carbon double bond derived from the conjugated diene compound has a hydrogenation rate of 30 to 95 mol %, and the modifying group (p) has a functional group equivalent weight of 700 to 20,000 g/eq. The modified liquid diene rubber (A) can be normally used as a liquid product at room temperature. Such a modified liquid diene rubber has a sufficiently high curing rate, and a resin composition containing the modified liquid diene rubber has a much higher curing rate than that in the related art. Furthermore, a cured product of the resin composition has excellent mechanical properties, transparency, and heat resistance derived from the modified liquid diene rubber.

The modifying group (p) in the modified liquid diene rubber (A) partly contains a (meth)acryloyl group therein. Examples of the modifying group (p) include groups partly containing a (meth)acryloyloxy group represented by formula (1) below or a (meth)acrylamide group represented by formula (2) below.

In the formulae (1) and (2), $R^a$ represents a hydrogen atom or a methyl group and $R^b$ represents an alkylene group or a polyalkylene glycol group ($\{-(CH_2)_n-O\}_m-$: n represents the number of carbon atoms in the alkylene group and m represents the number of repeating units of the polyalkylene glycol) whose hydrogen atom or carbon atom may be substituted with another group. The number of carbon atoms in the alkylene group is preferably 1 to 10 and more preferably 1 to 5. Furthermore, n for the polyalkylene glycol group is preferably 1 to 10 and more preferably 1 to 5, and m is preferably 1 to 5. In particular, $R^b$ is preferably an alkylene group having 1 to 5 carbon atoms, such as a methylene group, an ethylene group, a propylene group, a butylene group, or a pentylene group. The alkylene group or the polyalkylene glycol group may further have a substituent. Examples of the substituent include alkoxy groups, carboxy groups, hydroxy groups, alkylthio groups, halogen atoms, and (meth)acryloyl groups.

Among them, the modifying group (p) is particularly preferably a dicarboxylic acid monoester partly containing a (meth)acryloyl group therein. In particular, the modifying group (p) is preferably a dicarboxylic acid monoester having an ester group derived from a hydroxyalkyl (meth)acrylate or hydroxyalkyl (meth)acrylamide. Examples of the dicarboxylic acid monoester partly containing a (meth)acryloyl group therein include modifying groups (p) having structures represented by formulae (p1), (p1'), (p2), and (p2') below.

[Chem. 1]

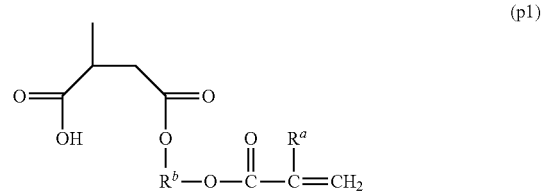

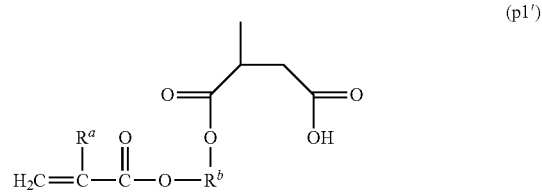

[Chem. 2]

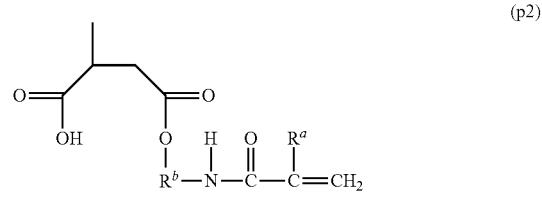

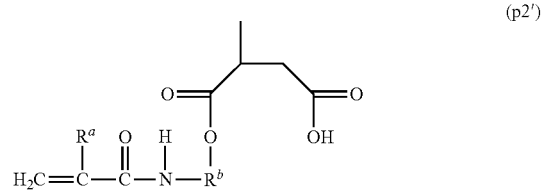

In the formulae (p1), (p1'), (p2), and (p2'), $R^a$ is the same as that in the formulae (1) and (2), and the definition, specific examples, and preferred embodiments of $R^b$ are the same as those in the formulae (1) and (2).

The functional group equivalent weight of the modifying group (p) in the modified liquid diene rubber (A) according to the present invention is 700 to 20,000 g/eq, preferably 1,000 to 20,000 g/eq, more preferably 1,500 to 20,000 g/eq, more preferably 2,000 to 15,000 g/eq, and more preferably 4,000 to 15,000 g/eq. When the functional group equivalent weight of the modifying group (p) partly containing a (meth)acryloyl group therein in the modified liquid diene rubber (A) is within the above range, a curable resin composition containing the modified liquid diene rubber (A) has a sufficiently high curing rate, and the resulting cured product exhibits high flexibility and good adhesion to substrates such as glass substrates and optical films. In this specification, the functional group equivalent weight of the modifying group (p) refers to a molecular weight of the modified liquid diene rubber (A) per modifying group (p). The functional group equivalent weight of the modifying group (p) is determined by using $^1$H-NMR based on the (meth)acryloyl group contained in the modifying group (p).

The modifying group (p) may bond to a polymer at any position such as a polymer terminal or a polymer main chain portion. The modifying group (p) preferably bonds to a polymer main chain from the viewpoints of functional group equivalent weight and ease of choice of a modifying method. When the modifying group (p) bonds to a polymer main chain, the amount of the modifying group (p) introduced can be increased compared with terminal-modified polymers, which improves the mechanical properties of the cured product. In the present invention, the polymer main chain refers to a group of carbon atoms on a main chain of a polymer constituted by carbon-carbon bonds, except for carbon atoms at the terminals of the polymer.

In addition to the modifying group (p), the modified liquid diene rubber (A) according to the present invention may have a modifying group (q) that does not partly contain a group having a polymerizable carbon-carbon double bond such as a (meth)acryloyl group. When the modifying group (q) is contained in the modified liquid diene rubber, the polarity of the modified liquid diene rubber (A) can be adjusted and the compatibility with any compound can be improved while the curing rate of the modified liquid diene rubber (A) and the mechanical strength, flexibility, glass transition temperature, and adhesion of the resulting cured product are maintained or improved.

The modifying group (q) is preferably at least one selected from dicarboxylic acid monoesters and dicarboxylic acid monoamides. A preferred embodiment of the modifying group (q) is at least one selected from dicarboxylic acid monoesters represented by formula (q1) or (q1') below and dicarboxylic acid monoamides represented by formula (q2) or (q2') below.

[Chem. 3]

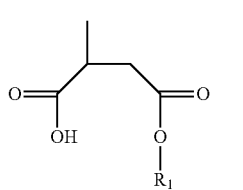

(q1)

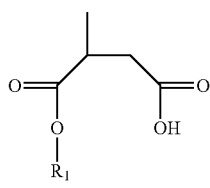

(q1')

In the formulae (q1) and (q1'), $R_1$ represents an alkyl group that does not partly contain a (meth)acryloyl group therein and may be substituted.

$R_1$ preferably represents an alkyl group having 1 to 20 carbon atoms and more preferably represents a linear, branched, or cyclic alkyl group having 1 to 6 carbon atoms, such as a methyl group, an ethyl group, a propyl group, a butyl group, a pentyl group, or a hexyl group.

[Chem. 4]

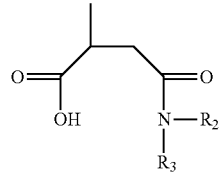

(q2)

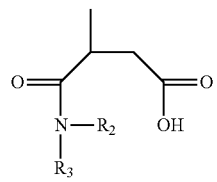

(q2')

In the formulae (q2) and (q2'), $R_2$ and $R_3$ represent a hydrogen atom or an alkyl group that does not partly contain a (meth)acryloyl group therein and may be substituted.

$R_2$ and $R_3$ preferably represent an alkyl group having 1 to 20 carbon atoms and more preferably represent a linear, branched, or cyclic alkyl group having 1 to 6 carbon atoms, such as a methyl group, an ethyl group, a propyl group, a butyl group, a pentyl group, or a hexyl group.

$R_1$, $R_2$, and $R_3$ may be substituted, and examples of the substituent include an alkoxy group, an alkoxysilyl group, a carboxy group, a hydroxy group, an alkylthio group, and a halogen atom. The number of substituents is preferably 1 to 5 and more preferably 1 to 3.

Among them, the modifying group (q) is more preferably a dicarboxylic acid monoester and particularly preferably a dicarboxylic acid monoester with an ester moiety represented by formula —COO—$C_nH_{2n+1}$ (n: integer satisfying $1 \le n \le 20$) or a dicarboxylic acid monoester with an ester moiety represented by formula —COO—$C_nH_{2n+1-m}X_m$ (n: integer satisfying $1 \le n \le 20$, m: $1 \le m \le 2n+1$, X: substituent). Examples of the substituent X include the above-described alkoxy group, alkoxysilyl group, carboxy group, hydroxy group, alkylthio group, and halogen atom. Herein, m is preferably an integer of 1 to 5 and more preferably an integer of 1 to 3, and n is preferably an integer of 1 to 6.

The functional group equivalent weight of the modifying group (q) in the modified liquid diene rubber (A) according to the present invention is preferably 700 to 40,000 g/eq, more preferably 1,000 to 30,000 g/eq, more preferably 1,000 to 20,000 g/eq, more preferably 1,200 to 10,000 g/eq, and particularly preferably 1,200 to 5,500 g/eq. When the functional group equivalent weight of the modifying group (q) in the modified liquid diene rubber (A) is within the above range, the curing rate of the modified liquid diene rubber (A) and the mechanical strength, flexibility, glass transition temperature, and adhesion of the cured product can be maintained or improved. Furthermore, even when mixing with a (meth)acrylate monomer having a relatively high polarity is performed, high compatibility is achieved and a curable resin composition having high transparency is obtained. In this specification, the functional group equivalent weight of the modifying group (q) refers to a molecular weight of the modified liquid diene rubber (A) per modifying group (q). The functional group equivalent weight of the modifying group (q) can be determined by using $^1$H-NMR in the same manner as in the modifying group (p).

The modifying group (q) may be introduced to a polymer terminal or a polymer side chain of the liquid diene rubber. The modifying group (q) may be contained alone or two or more modifying groups (q) may be contained.

The hydrogenation rate of a carbon-carbon double bond derived from a conjugated diene compound in the modified liquid diene rubber is 30 to 95 mol %. When the hydrogenation rate is within the above range, the percentage of a non-hydrogenated carbon-carbon double bond (the residual percentage of the carbon-carbon double bond derived from a conjugated diene compound) is 5 to 70 mol %, and inhibition of a radical reaction due to the presence of double bonds does not easily occur compared with the case of non-hydrogenated modified liquid diene rubbers (the residual percentage of the carbon-carbon double bond derived from a conjugated diene compound is 100 mol %). Thus, the curing rate is further improved. If the hydrogenation rate is excessively high, that is, if the hydrogenation rate exceeds 95 mol %, the residual percentage of the carbon-carbon double bond derived from a conjugated diene compound decreases and the number of crosslinking points decreases. Consequently, the resin composition is not cured or a cured product having good mechanical properties is not obtained.

The hydrogenation rate of the carbon-carbon double bond derived from a conjugated diene compound in the modified liquid diene rubber is preferably 40 to 95 mol %, more preferably 50 to 95 mol %, more preferably 60 mol % to 95 mol %, and more preferably 70 mol % to 90 mol % from the viewpoints of curing rate, compatibility with other materials, and mechanical properties and heat resistance after curing.

The hydrogenation rate of the liquid diene rubber can be calculated from the amount of a double bond derived from a conjugated diene compound in the liquid diene rubber before or after the introduction of the modifying group (p). The amount of a double bond can be determined by using $^1$H-NMR.

The melt viscosity at 38° C. of the modified liquid diene rubber (A) according to the present invention is preferably 0.1 to 5,000 Pa·s, more preferably 0.1 to 4,000 Pa·s, more preferably 0.1 to 3,000 Pa·s, more preferably 0.8 to 2,000 Pa·s, particularly preferably 1.0 to 1,000 Pa·s, and most preferably 10 to 1,000 Pa·s. When the melt viscosity of the modified liquid diene rubber (A) is within the above range, good workability is achieved in the production of a curable resin composition described later. In addition, the compatibility with a monomer (C) described later, such as a (meth)acrylate monomer, can be improved and bleedout after curing tends to be reduced. In the present invention, the melt viscosity of the modified liquid diene rubber (A) is determined with a B-type viscometer.

The number-average molecular weight (Mn) of the modified liquid diene rubber (A) according to the present invention is preferably 1,000 to 80,000, more preferably 3,000 to 70,000, more preferably 5,000 to 60,000, more preferably 8,000 to 50,000, and particularly preferably 10,000 to 50,000. When Mn of the modified liquid diene rubber (A) is within the above range, a curable resin composition that has a low viscosity contributing to good workability, has a high curing rate when cured with active energy rays, and provides a cured product having high flexibility is obtained. In the case where mechanical strength and stretchability after curing are required, the number-average molecular weight of the modified liquid diene rubber (A) is preferably 10,000 to 50,000, more preferably 12,000 to 50,000, and more preferably 14,000 to 50,000. In the present invention, Mn of the modified liquid diene rubber (A) is a number-average molecular weight in terms of standard polystyrene determined by gel permeation chromatography (GPC).

The molecular-weight distribution (Mw/Mn) of the modified liquid diene rubber (A) is preferably 1.0 to 8.0, more preferably 1.0 to 5.0, and more preferably 1.0 to 3.0. When Mw/Mn is within the above range, the modified liquid diene rubber (A) obtained shows a small variation in viscosity, which is more preferable.

The glass transition temperatures (Tg) of the modified liquid diene rubber (A) according to the present invention and a cured product obtained from a resin composition containing the modified liquid diene rubber (A) are preferably −100 to 10° C., more preferably −100 to 0° C., more preferably −100 to −5° C., more preferably −100 to −20° C., particularly preferably −100 to −30° C., and most preferably −100 to −50° C. When Tg is within the above range, for example, the coatability of the curable resin composition and the mechanical strength and flexibility at low temperature after curing are improved. The vinyl content of the modified liquid diene rubber (A) is preferably 99 mass % or less and more preferably 90 mass % or less. When the vinyl content is within the above range, the viscosity and Tg of the modified liquid diene rubber (A) fall within the appropriate ranges, and ease of handling is improved. Furthermore, the resin composition containing the modified liquid diene rubber (A) has good coatability, and the resulting cured product has high flexibility and also has high mechanical strength and high flexibility at low temperature.

[Method for Producing Modified Liquid Diene Rubber (A)]

The modified liquid diene rubber (A) can be produced by, for example, causing a reaction in which a modifying group (p) is introduced into an unmodified liquid diene rubber (A') containing a monomer unit (a1) derived from a conjugated diene compound and causing a hydrogenation reaction of a carbon-carbon double bond derived from a conjugated diene compound contained in the liquid diene rubber.

The unmodified liquid diene rubber (A') containing a monomer unit (a1) derived from a conjugated diene compound can be produced by polymerizing a monomer containing a conjugated diene compound.

Examples of the conjugated diene compound include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, and chloroprene. In particular, butadiene or isoprene is preferable, and isoprene is more preferable. These conjugated diene compounds may be used alone or in combination of two or more.

The monomer containing a conjugated diene compound may contain, in addition to the above-described conjugated diene compound, other copolymerizable monomers such as an aromatic vinyl compound. Examples of the aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl) styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. In particular, styrene, α-methylstyrene, and 4-methylstyrene are preferred.

In the unmodified liquid diene rubber (A'), the percentage of the aromatic vinyl compound unit with respect to the total of the conjugated diene unit and the aromatic vinyl compound unit is preferably 50 mass % or less, more preferably 40 mass % or less, and more preferably 30 mass % or less from the viewpoints of, for example, the compatibility with a monomer (C) described later, such as a (meth)acrylate monomer, decrease in viscosity, and high flexibility after curing.

Among them, the modified liquid diene rubber (A) is preferably produced using, as the unmodified liquid diene rubber (A'), polyisoprene or a copolymer containing an isoprene unit from the viewpoint of achieving higher curing rate.

The unmodified liquid diene rubber (A') can be produced by, for example, an emulsion polymerization process or a solution polymerization process.

The emulsion polymerization process may be a publicly known process or a process similar to the publicly known process. For example, a monomer containing a certain amount of conjugated diene is emulsified in the presence of an emulsifier, and emulsion polymerization is performed using a radical polymerization initiator.

Examples of the emulsifier include long-chain fatty acid salts having 10 or more carbon atoms and rosin acid salts. Examples of the long-chain fatty acid salts include potassium salts and sodium salts of fatty acids such as capric acid, lauric acid, myristic acid, palmitic acid, oleic acid, and stearic acid.

Water is normally used for the dispersion medium, and a water-soluble organic solvent such as methanol or ethanol may be contained as long as the stability during polymerization is not inhibited.

Examples of the radical polymerization initiator include persulfates such as ammonium persulfate and potassium persulfate, organic peroxides, and hydrogen peroxide.

A chain transfer agent may be used to adjust the molecular weight of the unmodified liquid diene rubber (A') obtained. Examples of the chain transfer agent include mercaptans such as t-dodecylmercaptan and n-dodecylmercaptan, carbon tetrachloride, thioglycolic acid, diterpene, terpinolene, γ-terpinene, and α-methylstyrene dimer.

The temperature of the emulsion polymerization can be appropriately set in accordance with the type of radical polymerization initiator used, but is normally 0° C. to 100° C. and preferably 0° C. to 60° C. The polymerization may be performed by a continuous polymerization process or a batch polymerization process.

The polymerization reaction can be terminated by addition of a polymerization terminator. Examples of the polymerization terminator include amine compounds such as isopropylhydroxylamine, diethylhydroxylamine, and hydroxylamine; quinone compounds such as hydroquinone and benzoquinone; and sodium nitrite.

After termination of the polymerization reaction, unreacted monomers are removed from the resulting latex when necessary. Then, the liquid diene rubber (A') is coagulated using, as a coagulant, a salt such as sodium chloride, calcium chloride, or potassium chloride while the pH of the coagulation system is adjusted to a particular value by adding an acid such as nitric acid or sulfuric acid when necessary. Then, the dispersion solvent is separated. Subsequently, washing with water, dehydration, and then drying are performed to obtain an unmodified liquid diene rubber (A'). In the coagulation, the latex may be optionally mixed with an extender oil prepared in the form of emulsified dispersion in advance to obtain an oil-extended rubber as the unmodified liquid diene rubber (A').

The solution polymerization process may be a publicly known process or a process similar to the publicly known process. For example, a monomer containing a conjugated diene is polymerized in a solvent using a Ziegler catalyst, a metallocene catalyst, or an active metal or active metal compound that can cause anionic polymerization in the presence of a polar compound when necessary.

Examples of the solvent include aliphatic hydrocarbons such as n-butane, n-pentane, isopentane, n-hexane, n-heptane, and isooctane; alicyclic hydrocarbons such as cyclopentane, cyclohexane, and methylcyclopentane; and aromatic hydrocarbons such as benzene, toluene, and xylene.

Examples of the active metal that can cause anionic polymerization include alkali metals such as lithium, sodium, and potassium; alkaline-earth metals such as beryllium, magnesium, calcium, strontium, and barium; and lanthanoid rare earth metals such as lanthanum and neodymium.

Among the active metals that can cause anionic polymerization, an alkali metal and an alkaline-earth metal are preferable and an alkali metal is more preferable.

The active metal compound that can cause anionic polymerization is preferably an organic alkali metal compound. Examples of the organic alkali metal compound include organomonolithium compounds such as methyllithium, ethyllithium, n-butyllithium, sec-butyllithium, t-butyllithium, hexyllithium, phenyllithium, and stilbenelithium; polyfunctional organolithium compounds such as dilithiomethane, dilithionaphthalene, 1,4-dilithiobutane, 1,4-dilithio-2-ethylcyclohexane, 1,3,5-trilithiobenzene; and sodium naphthalene and potassium naphthalene. Among the organic alkali metal compounds, an organolithium compound is preferable and an organomonolithium compound is more preferable.

The amount of the organic alkali metal compound used can be appropriately determined in accordance with, for example, the melt viscosity and molecular weight of the unmodified liquid diene rubber (A') and the modified liquid diene rubber (A), but is normally 0.01 to 3 parts by mass relative to 100 parts by mass of all the monomers containing a conjugated diene.

The organic alkali metal compound may be used as an organic alkali metal amide by being reacted with a secondary amine such as dibutylamine, dihexylamine, or dibenzylamine.

The polar compound is normally used to control a microstructure of a conjugated diene moiety without inactivating the reaction in the anionic polymerization. Examples of the polar compound include ether compounds such as dibutyl ether, tetrahydrofuran, ethylene glycol diethyl ether; tertiary amines such as tetramethylethylenediamine and trimethylamine; and alkali metal alkoxides and phosphine compounds. The polar compound is normally used in an amount of 0.01 to 1000 mol relative to the organic alkali metal compound.

The temperature of the solution polymerization is normally −80° C. to 150° C., preferably 0° C. to 100° C., and more preferably 10° C. to 90° C. The polymerization may be performed by a batch polymerization process or a continuous polymerization process.

The polymerization reaction can be terminated by addition of a polymerization terminator. Examples of the polymerization terminator include alcohols such as methanol and isopropanol. The resulting polymerization reaction solution is poured into a poor solvent such as methanol to precipitate an unmodified liquid diene rubber (A'). Alternatively, the polymerization reaction solution is washed with water, separated, and then dried. Thus, an unmodified liquid diene rubber (A') can be isolated.

Among the polymerization processes, the unmodified liquid diene rubber (A') is preferably produced by the solution polymerization process.

The modifying group (p) can be formed as follows. For example, an unsaturated dicarboxylic anhydride is added to the unmodified liquid diene rubber (A') to produce an unsaturated dicarboxylic anhydride-modified liquid diene rubber (A"). A modifying compound (p') partly containing a (meth)acryloyl group therein (hereafter may be abbreviated as a "modifying compound (p')") is caused to react with the unsaturated dicarboxylic anhydride-modified liquid diene rubber (A").

Examples of the unsaturated dicarboxylic anhydride used to produce the unsaturated dicarboxylic anhydride-modified liquid diene rubber (A") include maleic anhydride, citraconic anhydride, and itaconic anhydride. In particular, maleic anhydride is preferred from the viewpoint of cost efficiency.

The unsaturated dicarboxylic anhydride is added to the unmodified liquid diene rubber (A') by any method such as a method in which an unsaturated dicarboxylic anhydride and, when necessary, a radical catalyst are added to a liquid diene rubber and the resulting mixture is heated in the presence or absence of an organic solvent.

Examples of the organic solvent used in the above method include hydrocarbon solvents and halogenated hydrocarbon solvents. Among the organic solvents, hydrocarbon solvents such as n-butane, n-hexane, n-heptane, cyclohexane, benzene, toluene, and xylene are preferred.

Examples of the radical catalyst used in the above method include peroxides such as di-s-butyl peroxydicarbonate, t-amyl peroxypivalate, t-amyl peroxy-2-ethylhexanoate, di-t-butyl peroxide, and 1,4-bis[(t-butylperoxy)isopropyl]benzene; and azo compounds such as 2,2'-azobis(4-methoxy-2,4-dimethylvaleronitrile), 2,2'-azobis(isobutyronitrile), 1,1'-azobis(cyclohexane-1-carbonitrile), and 1-[(1-cyano-1-methylethyl)azo]formamide. Among them, di-t-butyl peroxide, 1,4-bis[(t-butylperoxy)isopropyl]benzene, 2,2T-azobis(isobutyronitrile), 1,1'-azobis(cyclohexane-1-carbonitrile), and 1-[(1-cyano-1-methylethyl)azo]formamide are preferred from the viewpoints of safety and reaction efficiency.

It is sufficient that the amount of the unsaturated dicarboxylic anhydride used is determined so that the functional group equivalent weight of the modifying group (p) is within a desired range such as 700 to 20,000 g/eq. The amount of the unsaturated dicarboxylic anhydride used is preferably 0.5 to 20 parts by mass, more preferably 0.5 to 12 parts by mass, more preferably 0.5 to 8 parts by mass, and more preferably 0.7 to 6 parts by mass relative to 100 parts by mass of the unmodified liquid diene rubber (A'). The amount of the unsaturated dicarboxylic anhydride added to the unsaturated dicarboxylic anhydride-modified liquid diene rubber (A") is preferably 0.5 to 20 parts by mass, more preferably 0.5 to 12 parts by mass, more preferably 0.5 to 8 parts by mass, and more preferably 0.7 to 6 parts by mass relative to 100 parts by mass of the unmodified liquid diene rubber (A').

The temperature at which the unsaturated dicarboxylic anhydride is added to the unmodified liquid diene rubber (A') by the above method is preferably 100° C. to 250° C. and more preferably 140° C. to 200° C. The reaction time is preferably 4 to 50 hours.

In order to suppress the molecular weight reduction, discoloration, and gelation caused by degradation in the modification reaction, an appropriate antioxidant may be optionally added when the unsaturated dicarboxylic anhydride is added to the unmodified liquid diene rubber (A') or during the storage of the modified polymer.

Examples of the antioxidant include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (trade name: AO-40, manufactured by ADEKA Corporation), 3,9-bis[1,1-dimethyl-2-[3-(3-t-butyl-4-hydroxy-5-methylphenyl)propionyloxy]ethyl]-2,4,8,10-tetraoxaspiro[5.5]undecane (trade name: AO-80, manufactured by ADEKA Corporation), 2,4-bis[(octylthio)methyl]-6-methylphenol (trade name: Irganox 1520L, manufactured by BASF Japan), 2,4-bis[(dodecylthio)methyl]-6-methylphenol (trade name: Irganox 1726, manufactured by BASF Japan), 2-[1-(2-hydroxy-3,5-di-t-pentylphenyl)ethyl]-4,6-di-t-pentylphenyl acrylate (trade name: Sumilizer GS, manufactured by Sumitomo Chemical Co., Ltd.), 2-t-butyl-6-(3-t-butyl-2-hydroxy-5-methylbenzyl)-4-methylphenyl acrylate (trade name: Sumilizer GM, manufactured by Sumitomo Chemical Co., Ltd.), 6-t-butyl-4-[3-(2,4,8,10-tetra-t-butyldibenzo[d,f] [1,3,2]dioxaphosphepin-6-yloxy)propyl]-2-methylphenol (trade name: Sumilizer GP, manufactured by Sumitomo Chemical Co., Ltd.), tris(2,4-di-t-butylphenyl) phosphite (trade name: Irgafos 168, manufactured by BASF Japan), dioctadecyl 3,3'-dithiobispropionate, hydroquinone, p-methoxyphenol, N-phenyl-N'-(1,3-dimethylbutyl)-p-phenylenediamine (trade name: NOCRAC 6C, manufactured by OUCHI SHINKO CHEMICAL INDUSTRIAL Co., Ltd.), bis(2,2,6,6-tetramethyl-4-piperidyl)sebacate (trade name: LA-77Y, manufactured by ADEKA Corporation), N,N-dioctadecylhydroxylamine (trade name: Irgastab FS 042, manufactured by BASF Japan), bis(4-t-octylphenyl)amine (trade name: Irganox 5057, manufactured by BASF Japan), hydroquinone, and p-methoxyphenol. These antioxidants may be used alone or in combination of two or more. Note that the above-mentioned trade names and manufacturers of the antioxidants are merely examples.

The amount of the antioxidant added is preferably 0.01 to 10 parts by mass and more preferably 0.1 to 3 parts by mass relative to 100 parts by mass of the unmodified liquid diene rubber (A') or the modified liquid diene rubber (A).

The modifying compound (p') is caused to react with the thus-produced unsaturated dicarboxylic anhydride-modified liquid diene rubber (A") so that a desired functional group equivalent weight is achieved. Through a reaction of the modifying compound (p') with an unsaturated dicarboxylic anhydride group contained in the unsaturated dicarboxylic anhydride-modified liquid diene rubber (A"), the modified liquid diene rubber (A) having the modifying group (p) according to the present invention can be produced.

The modifying compound (p') caused to react with the unsaturated dicarboxylic anhydride-modified liquid diene rubber (A") is preferably a compound having a (meth)acryloyl group and a hydroxyl group and more preferably a hydroxyalkyl (meth)acrylate or a hydroxyalkyl(meth)acrylamide.

Examples of the hydroxyalkyl (meth)acrylate include 2-hydroxyethyl (meth)acrylate, 2-hydroxypropyl (meth)acrylate, 2-hydroxybutyl (meth)acrylate, 2-hydroxy-3-acryloyloxypropyl methacrylate, glycerol dimethacrylate, and pentaerythritol triacrylate. Among them, 2-hydroxyethyl (meth)acrylate is preferred.

Examples of the hydroxyalkyl(meth)acrylamide include 2-hydroxyethyl(meth)acrylamide, 2-hydroxypropyl(meth)acrylamide, and 2-hydroxybutyl(meth)acrylamide. Among them, 2-hydroxyethyl(meth)acrylamide is preferred.

The temperature of the above reaction is preferably 25° C. to 150° C. and more preferably 50° C. to 100° C. The reaction time may be appropriately determined so that the modifying group (p) has a desired functional group equivalent weight, but is normally 1 to 24 hours.

The amount of the modifying compound (p') added is preferably 0.5 to 1.5 molar equivalents and more preferably 0.7 to 1.2 molar equivalents relative to the unsaturated dicarboxylic anhydride group contained in the unsaturated dicarboxylic anhydride-modified liquid diene rubber (A") from the viewpoint of cost efficiency.

A modified liquid diene rubber (A) having, in addition to the modifying group (p), a polar group (q) that does not partly contain a group having a polymerizable carbon-carbon double bond, such as a (meth)acryloyl group, is produced as follows. The modifying compound (p') and a modifying compound (q') that has a functional group which reacts with an acid anhydride, such as a hydroxy group, an amino group, or an imino group, and that does not intramolecularly contain a group having a polymerizable carbon-carbon double bond, such as a (meth)acryloyl group, (hereafter may be abbreviated as a "modifying compound (q')") are caused to react with the above-described unsaturated dicarboxylic anhydride-modified liquid diene rubber (A") so that desired amounts (e.g., desired functional group equivalent weights) are achieved. Through a reaction of the modifying compound (p') and the modifying compound (q') with the unsaturated dicarboxylic anhydride group contained in the unsaturated dicarboxylic anhydride-modified liquid diene rubber (A"), a modified liquid diene rubber (A) having the modifying group (p) and the modifying group (q) according to the present invention can be produced.

The modifying compound (q') is not particularly limited as long as the modifying compound (q') has a functional group that reacts with an acid anhydride, such as a hydroxy group, an amino group, or an imino group and that does not intramolecularly contain a group having a polymerizable carbon-carbon double bond, such as a (meth)acryloyl group. The modifying compound (q') is preferably an alcohol having 1 to 20 carbon atoms, an amine having 1 to 20 carbon atoms, or water, more preferably a saturated alcohol having 1 to 20 carbon atoms, and more preferably methanol, ethanol, propanol, butanol, 3-methylbutanol, N,N-dimethyl-2-aminoethanol, and 3-methyl-1,3-butanediol from the viewpoint of ease of modification reaction.

The hydrogenation reaction of a carbon-carbon double bond derived from a conjugated diene compound contained in the liquid diene rubber can be caused through a publicly known process or a process similar to the publicly known process. For example, a solution is prepared by dissolving the unmodified liquid diene rubber (A') or the unsaturated dicarboxylic anhydride-modified liquid diene rubber (A") in a solvent that is inactive to a hydrogenation catalyst. The prepared solution is caused to react with hydrogen in the presence of a hydrogenation catalyst.

Examples of the hydrogenation catalyst include Raney nickel; heterogeneous catalysts obtained by allowing a metal such as Pt, Pd, Ru, Rh, or Ni to be supported on a carrier such as carbon, alumina, or diatomaceous earth; Ziegler catalysts obtained by combining a transition metal compound with, for example, an alkylaluminum compound or an alkyllithium compound; and metallocene catalysts. The hydrogenation reaction is not particularly limited as long as the hydrogenation rate of the carbon-carbon double bond derived from the conjugated diene compound can be adjusted to 30 to 95 mol %. The hydrogenation rate is preferably adjusted by appropriately selecting the amount of catalyst, hydrogen pressure, and reaction temperature to control the reaction rate. In general, the reaction rate is decreased as the amount of catalyst is decreased or the hydrogen pressure and the reaction temperature are lowered. The hydrogen pressure is preferably 0.1 to 20 MPa and more preferably 0.1 to 10 MPa. The reaction temperature is preferably 20° C. to 250° C., more preferably 20° C. to 150° C., and more preferably 20° C. to 120° C. When a catalyst formed of a transition metal compound and an alkylaluminum compound is used as the hydrogenation catalyst, the hydrogenation catalyst is preferably used in such an amount that the number of moles of the transition metal compound serving as a constituent component of the hydrogenation catalyst is $1.0 \times 10^{-6}$ to $1.0 \times 10^{-1}$ times the number of moles of the carbon-carbon double bond derived from the conjugated diene compound in the liquid diene rubber. Furthermore, a polar compound may be added for the purpose of controlling the activity of the hydrogenation catalyst. Examples of the polar compound added include amine compounds such as N,N,N',N'-tetramethylethylenediamine and alcohols. The reaction time is normally 0.1 to 100 hours.

The concentration of the hydrogenation catalyst contained in the liquid diene rubber after the hydrogenation is preferably less than 500 ppm, more preferably less than 100 ppm, more preferably less than 20 ppm, and particularly preferably less than 10 ppm from the viewpoints of storage stability and transparency. The concentration of a metal element in a sample can be measured by, for example, atomic absorption spectrometry or ICP emission spectroscopy. In general, the hydrogenation catalyst is removed by being deactivated with a polar compound, then optionally adding an acid or a salt as a cleaner, and performing washing with water.

When the modified liquid diene rubber (A) according to the present invention is produced from the unmodified liquid diene rubber (A'), the order of the reaction through which the modifying group (p) is introduced and the hydrogenation reaction of a carbon-carbon double bond derived from a conjugated diene compound contained in the liquid diene rubber is not particularly limited as long as the modifying group (p) has a desired functional group equivalent weight and the hydrogenation rate of the carbon-carbon double bond derived from the conjugated diene compound is within a desired range.

For example, the modification reaction of the unmodified liquid diene rubber (A') is performed using an unsaturated dicarboxylic anhydride, and then the hydrogenation reaction of a carbon-carbon double bond derived from a conjugated diene compound is performed. Subsequently, a reaction through which the modifying group (p) is introduced in the end by adding the modifying compound (p') may be performed. Alternatively, the hydrogenation reaction of a carbon-carbon double bond derived from a conjugated diene compound in the unmodified liquid diene rubber (A') is performed, and then the modification reaction with an unsaturated dicarboxylic anhydride and the reaction through which the modifying group (p) is introduced by adding the modifying compound (p') may be performed.

When the modified liquid diene rubber (A) containing the modifying group (q) is produced from the unmodified liquid diene rubber (A'), the order of the reaction through which the modifying group (p) is introduced and the hydrogenation reaction of a carbon-carbon double bond derived from a conjugated diene compound contained in the liquid diene rubber is also not particularly limited as long as the modifying group (q) is in a desired state, the modifying group (p) has a desired functional group equivalent weight, and the hydrogenation rate of a carbon-carbon double bond derived from a conjugated diene compound is within a desired range. For example, the modification reaction of the unmodified liquid diene rubber (A') is performed using an unsaturated dicarboxylic anhydride, and then the hydrogenation reaction of a carbon-carbon double bond derived from a conjugated diene compound is performed. Subsequently, a reaction through which the modifying group (p) and the modifying group (q) are introduced in the end by adding the modifying compound (p') and the modifying compound (q') may be performed. Alternatively, the hydrogenation reaction of a carbon-carbon double bond derived from a conjugated diene compound in the unmodified liquid diene rubber (A') is performed, and then the modification reaction with an unsaturated dicarboxylic anhydride and the reaction through which the modifying group (p) and the modifying group (q) are introduced by adding the modifying compound (p') and the modifying compound (q') may be performed.

[Resin Composition]

The modified liquid diene rubber (A) according to the present invention can be used as a curable resin composition by adding a radical polymerization initiator (B).

[Radical Polymerization Initiator (B)]

The radical polymerization initiator (B) that can be used for the resin composition of the present invention is, for example, a radical photopolymerization initiator that is decomposed by active energy rays such as ultraviolet rays to generate a radical or a thermal-decomposition-type radical polymerization initiator that is decomposed by heating to generate a radical.

Examples of the radical photopolymerization initiator include ketones such as 2-hydroxy-2-methyl-1-phenylpropan-1-one, 1-hydroxycyclohexyl phenyl ketone, 2-methyl-[4-(methylthio)phenyl]-2-morpholino-1-propanone, 2,2-dimethoxy-1,2-diphenylethan-1-one, 1-[4-(2-hydroxyethoxy)phenyl]-2-hydroxy-2-methyl-1-propan-1-one, 2-hydroxy-1-[4-[4-(2-hydroxy-2-methylpropionyl)benzyl]phenyl]-2-methylpropan-1-one, 2-methyl-1-(4-methylthiophenyl)-2-morpholinopropan-1-one, 2-benzyl-2-dimethylamino-1-(4-morpholinophenyl)butanone, 2-(dimethylamino)-2-[(4-methylphenyl)methyl]-1-[4-(4-morpholinyl)phenyl]-1-butanone, camphorquinone, benzophenone, benzoin methyl ether, and benzoin ethyl ether; acylphosphine oxides such as 2,4,6-trimethylbenzoyldiphenylphosphine oxide and bis(2,4,6-trimethylbenzoyl)phenylphosphine oxide; titanocenes such as bis($\eta^5$-2,4-cyclopentadien-1-yl)bis(2,6-difluoro-3-(1H-pyrrol-1-yl)phenyl)titanium; oxime esters such as 1,2-octanedione-1-[4-(phenylthio)-2-(O-benzoyloxime)] and ethanone-1-[9-ethyl-6-(2-methylbenzoyl)-9H-carbazol-3-yl]-1-(O-acetyloxime); and oxyphenylacetates such as 2-[2-oxo-2-phenylacetoxyethoxy]ethyl oxyphenylacetate and 2-(2-hydroxyethoxy)ethyl oxyphenylacetate. Among them, ketones such as 2-hydroxy-2-methyl-1-phenylpropan-1-one and 1-hydroxycyclohexyl phenyl ketone, and acylphosphine oxides such as 2,4,6-trimethylbenzoyldiphenylphosphine oxide and bis(2,4,6-trimethylbenzoyl)phenylphosphine oxide are preferred.

Examples of the thermal-decomposition-type radical polymerization initiator include peroxides such as 1,1,3,3-tetramethylbutylperoxy-2-ethylhexanoate, 1,1-bis(t-butylperoxy)cyclohexane, 1,1-bis(t-butylperoxy)cyclododecane, di-t-butyl peroxyisophthalate, t-butyl peroxybenzoate, dicumyl peroxide, t-butylcumyl peroxide, 2,5-dimethyl-2,5-di(t-butylperoxy)hexane, 2,5-dimethyl-2,5-di(t-butylperoxy)-3-hexyne, and cumene hydroperoxide.

In the resin composition of the present invention, the content of the radical polymerization initiator (B) is preferably 0.1 to 20 mass %, more preferably 0.5 to 15 mass %, more preferably 1.0 to 10 mass %, and more preferably 1.5 to 6 mass % relative to the total amount of the resin composition. When the content of the radical polymerization initiator (B) is within the above range, the curing rate and the mechanical properties after curing are further improved.

[Radically Polymerizable Monomer (C) having Carbon-Carbon Double Bond]

The resin composition of the present invention may further contain a radically polymerizable monomer (C) having a carbon-carbon double bond. The radically polymerizable monomer (C) having a carbon-carbon double bond (hereafter may be abbreviated as a "monomer (C)") refers to a monomer that can be polymerized using the radical polymerization initiator (B) which generates a radical by applying active energy rays or heat. Examples of the monomer (C) include monosubstituted vinyl compounds such as styrene, acrylate, acrylamide, acrylonitrile, vinyl acetate, and vinyl chloride; 1,1-disubstituted vinyl compounds such as α-methylstyrene, methacrylate, and methacrylamide; cycloolefins such as acenaphthylene and N-substituted maleimide; and conjugated diene compounds such as butadiene and isoprene. Among them, (meth)acrylates are preferred, and monofunctional (meth)acrylates, bifunctional (meth)acrylates, and tri- or higher functional polyvalent (meth)acrylates can be used.

Examples of the monofunctional (meth)acrylates include alkyl mono(meth)acrylates such as methyl (meth)acrylate, ethyl (meth)acrylate, propyl (meth)acrylate, butyl (meth)acrylate, 2-ethylhexyl (meth)acrylate, isodecyl (meth)acrylate, isooctyl (meth)acrylate, lauryl (meth)acrylate, stearyl (meth)acrylate, and isostearyl (meth)acrylate; alicyclic mono(meth)acrylates such as cyclohexyl (meth)acrylate, dicyclopentanyl (meth)acrylate, and isobornyl (meth)acrylate; dicyclopentenyl group-containing mono(meth)acrylates such as dicyclopentenyl (meth)acrylate and dicyclopentenyloxyethyl (meth)acrylate; aryl mono(meth)acrylates such as phenyl acrylate and benzyl acrylate; phenoxy group-containing mono(meth)acrylates such as phenoxyhydroxypropyl (meth)acrylate, phenoxyethyl (meth)acrylate, phenoxyethylene glycol (meth)acrylate, and phenoxypolyethylene glycol (meth)acrylate; alkoxyalkyl mono(meth)acrylates such as 2-butoxyethyl (meth)acrylate; hydroxy group-containing (meth)acrylates such as 2-hydroxyethyl (meth)acrylate, 2-hydroxypropyl (meth)acrylate, 2-hydroxybutyl (meth)acrylate, and butoxyhydroxypropyl (meth)acrylate; amino group-containing (meth)acrylates such as N,N-diethylaminoethyl (meth)acrylate and N,N-dimethylaminoethyl (meth)acrylate; epoxy group-containing (meth)acrylates such as glycidyl (meth)acrylate; alkoxydialkylene glycol mono(meth)acrylates such as methoxydiethylene glycol (meth)acrylate and methoxydipropylene glycol (meth)acrylate; fluorine group-containing (meth)acrylates such as tetrafluoropropyl (meth)acrylate and heptadecafluorodecyl (meth)acrylate; and nonylphenoxypolyethylene glycol (meth)acrylate, nonylphenoxypolypropylene glycol (meth)acrylate, and morpholine (meth)acrylate.

Examples of the bifunctional (meth)acrylates include alkylene glycol di(meth)acrylates such as 1,4-butenediol di(meth)acrylate, neopentyl glycol diacrylate, 1,6-hexanediol di(meth)acrylate, and 1,9-nonanediol di(meth)acrylate; polyalkylene glycol di(meth)acrylates such as diethylene glycol di(meth)acrylate, triethylene glycol di(meth)acrylate, and tripropylene glycol di(meth)acrylate; di(meth)acrylates having an ester group-containing diol skeleton, such as neopentylglycol hydroxypivalate di(meth)acrylate; alicyclic di(meth)acrylates such as dicyclopentanyl di(meth)acrylate, tricyclodecane dimethanol di(meth)acrylate, and ethoxylated hydrogenated bisphenol A di(meth)acrylate; and hydroxypropyl di(meth)acrylate, diethylene glycol bis(hydroxypropyl (meth)acrylate), and propoxylated bisphenol A bis(hydroxypropyl (meth)acrylate).

Examples of the polyfunctional (meth)acrylates such as tri- or higher functional (meth)acrylates include trimethylolpropane polyvalent (meth)acrylates such as trimethylolpropane tri(meth)acrylate, ditrimethylolpropane tetra(meth)acrylate, and hydroxypropylated trimethylolpropane tri(meth)acrylate; pentaerythritol polyvalent (meth)acrylates such as pentaerythritol tetra(meth)acrylate, dipentaerythritol hexa(meth)acrylate, and monohydroxypentaerythritol tri(meth)acrylate; and isocyanurate polyvalent (meth)acrylates such as tris((meth)acryloxyethyl)isocyanurate.

Among these (meth)acrylates, monofunctional (meth)acrylates such as alkyl mono(meth)acrylates, alicyclic mono(meth)acrylates, cyclopentenyl group-containing mono(meth)acrylates, aryl mono(meth)acrylates, phenoxy group-containing mono(meth)acrylates, alkoxyalkyl mono(meth)acrylates, hydroxy group-containing (meth)acrylates, amino group-containing (meth)acrylates, epoxy group-containing (meth)acrylates, alkoxydialkylene glycol mono(meth)acrylates, and fluorine group-containing (meth)acrylates; and bifunctional (meth)acrylates such as alkylene glycol di(meth)acrylates and alicyclic di(meth)acrylates are preferable. Monofunctional (meth)acrylates such as alkyl mono(meth)acrylates, alicyclic mono(meth)acrylates, and cyclopentenyl group-containing mono(meth)acrylates are further preferable.

These monomers (C) may be used alone or in combination of two or more.

In the resin composition of the present invention, the mass ratio [(A)/(C)] of the modified liquid diene rubber (A) to the monomer (C) is preferably 0.01 to 100, more preferably 0.05 to 50, more preferably 0.1 to 25, and more preferably 0.1 to 10. When the ratio of the modified liquid diene rubber (A) to the monomer (C) added is within the above range, a resin composition which has a very high curing rate, whose volume change during curing is small, and which exhibits high flexibility after curing is obtained.

[Other Optional Components]

Additives such as a curing accelerator, a tackifier, a plasticizer, an antioxidant, an ultraviolet absorber, a hindered amine light stabilizer, a softener, an antifoaming agent, a pigment, a dye, an organic filler, and a perfume may be added to the resin composition of the present invention as long as the characteristics of the resin composition are not impaired.

A liquid diene rubber not containing a (meth)acryloyl group may be added to the resin composition of the present invention for the purpose of improving the characteristics such as ease of handling and flexibility after curing. The liquid diene rubber not containing a (meth)acryloyl group is, for example, the above-described unsaturated dicarboxylic anhydride-modified liquid diene rubber (A''), the unmodified liquid diene rubber (A'), or a hydrogenated liquid diene rubber ($A_H'$) obtained by hydrogenating the unmodified liquid diene rubber (A'). Among them, the unmodified liquid diene rubber (A') and the hydrogenated liquid diene rubber ($A_H'$) can be suitably used. When the resin composition of the present invention contains a liquid diene rubber not containing a (meth)acryloyl group, such as the unmodified liquid diene rubber (A') or the hydrogenated liquid diene rubber ($A_H'$), a cured product having high flexibility and high elongation can be obtained.

The content of the liquid diene rubber not containing a (meth)acryloyl group, such as the unmodified liquid diene rubber (A') or the hydrogenated liquid diene rubber ($A_H'$), is preferably 80 mass % or less and more preferably 50 mass % or less relative to the total amount of the resin composition from the viewpoints of ease of handling, curing rate, and high elongation and flexibility of cured films.

The resin composition of the present invention can be produced by, for example, mixing the modified liquid diene rubber (A), the radical polymerization initiator (B), and optionally the monomer (C) and other additives by using typical mixing means such as a stirrer or a kneader at room temperature.

The resin composition of the present invention is cured by irradiation with active energy rays and/or heating, and thus a cured product can be obtained. Only one of the irradiation with active energy rays and the heating may be performed, or both of them may be performed. When both of them are performed, preferably, the resin composition is irradiated with active energy rays and then heated during or after curing.

The active energy rays used are corpuscular rays, electromagnetic waves, and a combination of the foregoing. Examples of the corpuscular rays include electron beams (EB) and α rays. Examples of the electromagnetic waves include ultraviolet rays (UV), visible rays, infrared rays, γ rays, and X rays. Among them, electron beams (EB) or ultraviolet rays (UV) are preferably used.

Irradiation with the active energy rays can be performed using a publicly known device. For example, irradiation with electron beams (EB) is suitably performed at an acceleration voltage of 0.1 to 10 MeV at an irradiation dose of 1 to 500 kGy. In the case of ultraviolet rays (UV), for example, a lamp having a radiation wavelength of 200 nm to 450 nm can be suitably used as a radiation source. An example of the radiation source for electron beams (EB) is a tungsten filament. Examples of the radiation source for ultraviolet rays (UV) include a low-pressure mercury lamp, a high-pressure mercury lamp, an ultrahigh-pressure mercury lamp, a halogen lamp, an excimer lamp, a carbon arc lamp, a xenon lamp, a zirconium lamp, a fluorescent lamp, and ultraviolet rays in natural light. When the ultraviolet rays are used, the irradiation dose is preferably 100 to 10,000 mJ/cm$^2$. The irradiation time of the curable resin composition with the active energy rays is preferably 0.5 to 300 seconds though depending on the magnitude of the energy.

The resin composition of the present invention is excellent in terms of workability, has a very high curing rate, and has excellent storage stability. The cured product obtained from the resin composition has high transparency and heat resistance and also has excellent mechanical properties such as high strength. Therefore, the resin composition of the present invention can be suitably used for adhesives, pressure-sensitive adhesives (adhesives and pressure-sensitive adhesives may be referred to as "adhesives"), coating agents, sealing materials, and inks. Among them, the resin composition of the present invention has a high curing rate and high transparency and thus can be particularly suitably used for optical adhesives. Such an optical adhesive can be used for, for example, laminating of optical discs such as digital versatile discs (DVDs), laminating of touch panels, laminating of optical films used for flat panel displays such as liquid crystal displays and plasma displays, adhesion of optical lenses used for cameras and optical heads for playing DVDs and compact discs (CDs), and adhesion of optical members such as optical fibers. In addition, the adhesive can be used for electric/electronic members. For example, the adhesive can be used for adhesion of precision parts such as semiconductors to printed wiring boards and as dicing tapes for holding wafers in a backgrinding process and a dicing process in the semiconductor production. The coating agent can be used for, for example, coating of automotive head lamps and coating of optical fibers. The sealing material can be used for, for example, sealing of precision parts such as liquid crystal display elements, organic ELs, LEDs, semiconductors, and hard discs. The ink can be used as, for example, a resist ink used in the production of semiconductors and printed wiring boards and a printing ink used in printing on aluminum foil paper, polyethylene coat paper, vinyl chloride sheets, polyester sheets, polypropylene sheets, food cans, and beverage cans. Furthermore, the resin composition has high heat resistance and thus can be suitably used for onboard equipment.

EXAMPLES

Hereafter, the present invention will be further described in detail based on Examples, but the present invention is not limited to Examples.

Components used in Examples and Comparative Examples are listed below.

<Modified Liquid Diene Rubber (A)>
(Meth)acryloyl group-modified liquid polyisoprenes obtained in Production Examples 1 to 5 and 7 to 9 below and (Meth)acryloyl group-modified liquid polybutadiene obtained in Production Example 6 below <Radical Polymerization Initiator (B)>
B-1: Radical photopolymerization initiator, 2-hydroxy-2-methyl-1-phenylpropan-1-one (trade name: "DAROCUR 1173" manufactured by BASF)

<Radically Polymerizable Monomer (C) having Carbon-Carbon Double Bond>
C-1: monofunctional methacrylate, dicyclopentenyloxyethyl methacrylate (trade name: FA-512M manufactured by Hitachi Chemical Company, Ltd.)

[Chem. 5]

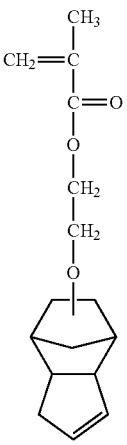

C-2: Monofunctional acrylate, isobornyl acrylate (trade name: "IBXA" manufactured by Osaka Organic Chemical Industry Ltd.)

<Hydrogenated Liquid Diene Rubber Not Containing (meth)acryloyl Group>
D-1: Hydrogenated polyisoprene ($A_H'$-10) obtained in Production Example 10 below
D-2: Hydrogenated butadiene-isoprene block copolymer containing hydroxyl group at one terminal (trade name: L-1302 manufactured by KURARAY Co., Ltd.)

<Modifying Compound (q') Not Containing (meth)acryloyl Group>
3-Methyl-1,3-butanediol (trade name: isoprene glycol manufactured by KURARAY Co., Ltd.)

Production Example 1

Methacryloyl Group-modified Partially Hydrogenated Liquid Polyisoprene (A-1)

Isoprene was subjected to anionic polymerization in n-hexane using n-butyllithium as an initiator to obtain a liquid polyisoprene (hereafter also referred to as a "polymer (A'-1)") having a number-average molecular weight of 28,000. In a 10 L autoclave, 3,000 g of the polymer (A'-1) and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $5.0 \times 10^{-5}$ times the number of moles of all unsaturated bonds in the polymer (A'-1), and the temperature was increased to 80° C. A reaction was caused to proceed under stirring for 7 hours while hydrogen was supplied as needed so that the hydrogen pressure was kept at 0.5 MPa. Thus, a partially hydrogenated liquid polyisoprene (hereafter also referred to as a "polymer ($A_H'$-1)") was obtained. A part of the resulting reaction liquid was taken and the polymer ($A_H'$-1) was analyzed by $^1$H-NMR. Consequently, 81% of the isoprene unit was hydrogenated. To 100 parts by mass of the purified polymer ($A_H'$-1), 1.5 parts by mass of maleic anhydride and 0.1 parts by mass of BHT (2,6-di-t-butyl-4-methylphenol, manufactured by HONSHU CHEMICAL INDUSTRY Co., Ltd.) were added, and a reaction was caused to proceed at 170° C. for 24 hours to obtain a maleic anhydride-modified partially hydrogenated liquid polyisoprene (A*-1) (hereafter also referred to as a "polymer (A*-1)"). The conversion of the maleic anhydride was 82%, and the amount of maleic anhydride added to the polymer (A*-1) was 1.2 parts by mass relative to 100 parts by mass of the polymer (A*-1). Furthermore, 1.0 molar equivalent of 2-hydroxyethyl methacrylate relative to the added maleic anhydride was added to the polymer (A*-1). After light shielding, a reaction was caused to proceed at 120° C. for 10 hours to synthesize a methacryloyl group-modified partially hydrogenated liquid polyisoprene (A-1). Table 1 shows the physical properties of the synthesized methacryloyl group-modified partially hydrogenated liquid polyisoprene (A-1).

Production Example 2

Acryloyl Group-modified Partially Hydrogenated Liquid Polyisoprene (A-2)

To the polymer (A*-1) obtained in Production Example 1, 1.0 molar equivalent of 2-hydroxyethyl acrylate relative to the added maleic anhydride was added. After light shielding, a reaction was caused to proceed at 120° C. for 10 hours to synthesize an acryloyl group-modified liquid polyisoprene (A-2). Table 1 shows the physical properties of the synthesized acryloyl group-modified liquid polyisoprene (A-2).

Production Example 3

Bifunctional (meth)acryloyl Group-modified Partially Hydrogenated Liquid Polyisoprene (A-3)

To the polymer (A*-1) obtained in Production Example 1, 1.0 molar equivalent of 2-hydroxy-3-acryloyloxypropyl methacrylate (trade name: "701A" manufactured by Shin Nakamura Chemical Co., Ltd.) relative to the added maleic anhydride was added. After light shielding, a reaction was caused to proceed at 120° C. for 10 hours to synthesize a bifunctional (meth)acryloyl group-modified partially hydrogenated liquid polyisoprene (A-3). Table 1 shows the physical properties of the synthesized bifunctional (meth)acryloyl group-modified partially hydrogenated liquid polyisoprene (A-3).

Production Example 4

Methacryloyl Group-modified Partially Hydrogenated Liquid Polyisoprene (A-4)

Isoprene was subjected to anionic polymerization in n-hexane using n-butyllithium as an initiator to obtain a liquid polyisoprene (hereafter also referred to as a "polymer (A'-2)") having a number-average molecular weight of 19,300. In a 10 L autoclave, 3,000 g of the polymer (A'-2) and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $5.0 \times 10^{-5}$ times the number of moles of all unsaturated bonds in the polymer (A'-2), and the temperature was increased to 80° C. A reaction was caused to proceed under stirring for 6 hours while hydrogen was supplied as needed so that the hydrogen pressure was kept at 0.5 MPa. Thus, a partially hydrogenated liquid polyisoprene (hereafter also referred to as a "polymer ($A_H'$-2)") was obtained. A part of the reaction liquid was taken and the polymer ($A_H'$-2) was analyzed by $^1$H-NMR. Consequently, 73% of the isoprene unit was hydrogenated. To 100 parts by mass of the purified polymer ($A_H'$-2), 1.5 parts by mass of maleic anhydride and 0.1 parts by mass of BHT (2,6-di-t-butyl-4-methylphenol, manufactured by HONSHU CHEMICAL INDUSTRY Co., Ltd.) were added, and a reaction was caused to proceed at 170° C. for 24 hours to obtain a maleic anhydride-modified partially hydrogenated liquid polyisoprene (A*-2) (hereafter also referred to as a "polymer (A*-2)"). The conversion of the maleic anhydride was 80%, and the amount of maleic anhydride added to the polymer (A*-2) was 1.2 parts by mass relative to 100 parts by mass of the polymer (A*-2). Furthermore, 1.0 molar equivalent of 2-hydroxyethyl methacrylate relative to the added maleic anhydride was added to the polymer (A*-2). After light shielding, a reaction was caused to proceed at 120° C. for 10 hours to synthesize a methacryloyl group-modified partially hydrogenated liquid polyisoprene (A-4). Table 1 shows the physical properties of the synthesized methacryloyl group-modified partially hydrogenated liquid polyisoprene (A-4).

Production Example 5

Methacryloyl Group-modified Partially Hydrogenated Liquid Polyisoprene (A-5)

In a 10 L autoclave, 3,000 g of the polymer (A'-1) obtained in Production Example 1 and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $5.0 \times 10^{-5}$ times the number of moles of all unsaturated bonds in the polymer (A'-1), and the temperature was increased to 80° C. A reaction was caused to proceed under stirring for 4 hours while hydrogen was supplied as needed so that the hydrogen pressure was kept at 0.5 MPa. Thus, a partially hydrogenated liquid polyisoprene (hereafter also referred to as a "polymer ($A_H'$-3)"). A part of the reaction liquid was taken and the polymer ($A_H'$-3) was analyzed by $^1$H-NMR. Consequently, 54% of the isoprene unit was hydrogenated. To 100 parts by mass of the purified polymer ($A_H'$-3), 1.5 parts by mass of maleic anhydride and 0.1 parts by mass of BHT (2,6-di-t-butyl-4-methylphenol, manufactured by HONSHU CHEMICAL INDUSTRY Co., Ltd.) were added, and a reaction was caused to proceed at 170° C. for 24 hours to obtain a maleic anhydride-modified partially hydrogenated liquid polyisoprene (A*-3) (hereafter also referred to as a "polymer (A*-3)"). The conversion of the maleic anhydride was 99%, and the amount of maleic anhydride added to the polymer (A*-3) was 1.5 parts by mass relative to 100 parts by mass of the polymer (A*-3). Furthermore, 1.0 molar equivalent of 2-hydroxyethyl methacrylate relative to the added maleic anhydride was added to the polymer (A*-3). After light shielding, a reaction was caused to proceed at 120° C. for 10 hours to synthesize a methacryloyl group-modified partially hydrogenated liquid polyisoprene (A-5). Table 1 shows the physical properties of the synthesized methacryloyl group-modified partially hydrogenated liquid polyisoprene (A-5).

Production Example 6

Methacryloyl Group-modified Partially Hydrogenated Liquid Polybutadiene (A-6)

Butadiene was subjected to anionic polymerization in n-hexane in the presence of THF using n-butyllithium as an initiator to obtain a liquid polybutadiene (hereafter also referred to as a "polymer (A'-3)") having a number-average molecular weight of 9,400. In a 10 L autoclave, 3,000 g of the polymer (A'-3) and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $3.0 \times 10^{-5}$ times the number of moles of all unsaturated bonds in the polymer (A'-3), and the temperature was increased to 70° C. A reaction was caused to proceed under stirring for 6 hours while hydrogen was supplied as needed so that the hydrogen pressure was kept at 0.5 MPa. Thus, a partially hydrogenated liquid polybutadiene (hereafter also referred to as a "polymer ($A_H'$-4)") was obtained. A part of the reaction liquid was taken and the polymer ($A_H'$-4) was analyzed by $^1$H-NMR. Consequently, 80% of the butadiene unit was hydrogenated. To 100 parts by mass of the purified polymer ($A_H'$-4), 2.0 parts by mass of maleic anhydride and 0.1 parts by mass of BHT (2,6-di-t-butyl-4-methylphenol, manufactured by HONSHU CHEMICAL INDUSTRY Co., Ltd.) were added, and a reaction was caused to proceed at 170° C. for 30 hours to obtain a maleic anhydride-modified partially hydrogenated liquid polybutadiene (A*-4) (hereafter also referred to as a "polymer (A*-4)"). The conversion of the maleic anhydride was 80%, and the amount of maleic anhydride added to the polymer (A*-4) was 1.6 parts by mass relative to 100 parts by mass of the polymer (A*-4). Furthermore, 1.0 molar equivalent of 2-hydroxyethyl methacrylate relative to the added maleic anhydride was added to the polymer (A*-4). After light shielding, a reaction was caused to proceed at 120° C. for 10 hours to synthesize a methacryloyl group-modified partially hydrogenated liquid polybutadiene (A-6). Table 1 shows the physical properties of the synthesized methacryloyl group-modified partially hydrogenated liquid polybutadiene (A-6).

Production Example 7

Methacryloyl Group-modified Hydrogenated Liquid Polyisoprene (A-7)

Isoprene was subjected to anionic polymerization in n-hexane using n-butyllithium as an initiator to obtain a liquid polyisoprene (hereafter also referred to as a "polymer (A'-4)") having a number-average molecular weight of 9,000. In a 10 L autoclave, 3,000 g of the polymer (A'-4) and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $1.5 \times 10^{-4}$ times the number of moles of all unsaturated bonds in the polymer (A'-4), and the temperature was increased to 80° C. A reaction was caused to proceed under stirring for 2 hours while hydrogen was supplied as needed so that the hydrogen pressure was kept at 1.0 MPa. Thus, a hydrogenated liquid polyisoprene (hereafter also referred to as a "polymer ($A_H'$-5)") was obtained. A part of the reaction liquid was taken and the polymer ($A_H'$-5) was analyzed by $^1$H-NMR. Consequently, 99% or more of the isoprene unit was hydrogenated. To 100 parts by mass of the purified polymer ($A_H'$-5), 1.5 parts by mass of maleic anhydride and 0.1 parts by mass of di-t-butyl peroxide (manufactured by NOF CORPORATION) were added, and a reaction was caused to proceed at 160° C. for 4 hours to obtain a maleic anhydride-modified hydrogenated liquid polyisoprene (A*-5) (hereafter also referred to as a "polymer (A*-5)"). The conversion of the maleic anhydride was 87%, and the amount of maleic anhydride added to the polymer (A*-5) was 1.3 parts by mass relative to 100 parts by mass of the polymer (A*-5). Furthermore, 1.0 molar equivalent of 2-hydroxyethyl methacrylate relative to the added maleic anhydride was added to the polymer (A*-5). After light shielding, a reaction was caused to proceed at 120° C. for 10 hours to synthesize a methacryloyl group-modified hydrogenated liquid polyisoprene (A-7). Table 1 shows the physical properties of the synthesized methacryloyl group-modified hydrogenated liquid polyisoprene (A-7).

Production Example 8

Methacryloyl Group-modified Liquid Polyisoprene (A-8)

To 100 parts by mass of the polymer (A'-2) obtained in Production Example 4, 1.1 parts by mass of maleic anhydride and 0.1 parts by mass of di-t-butyl peroxide (manufactured by NOF CORPORATION) were added, and a reaction was caused to proceed at 170° C. for 24 hours to obtain a maleic anhydride-modified hydrogenated liquid polyisoprene (A*-6) (hereafter also referred to as a "polymer (A*-6)"). The conversion of the maleic anhydride was 99%, and the amount of maleic anhydride added to the polymer (A*-6) was 1.1 parts by mass relative to 100 parts by mass of the polymer (A*-6). Furthermore, 1.0 molar equivalent of 2-hydroxyethyl methacrylate relative to the added maleic anhydride was added to the polymer (A*-6). After light shielding, a reaction was caused to proceed at 120° C. for 10 hours to synthesize a methacryloyl group-modified liquid polyisoprene (A-8). Table 1 shows the physical properties of the synthesized methacryloyl group-modified liquid polyisoprene (A-8).

Production Example 9

Methacryloyl Group-modified Hydrogenated Liquid Polyisoprene (A-9)

In a 10 L autoclave, 3,000 g of the polymer (A'-1) obtained in Production Example 1 and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $1.5 \times 10^{-4}$ times the number of moles of all unsaturated bonds in the polymer (A'-1), and the temperature was increased to 80° C. A reaction was caused to proceed under stirring for 2 hours while hydrogen was supplied as needed so that the hydrogen pressure was kept at 1.0 MPa. Thus, a hydrogenated liquid polyisoprene (hereafter also referred to as a "polymer ($A_H'$-6)") was obtained. A part of the reaction liquid was taken, and the polymer ($A_H'$-6) was analyzed by $^1$H-NMR. Consequently, 99% of the isoprene unit was hydrogenated. To 100 parts by mass of the purified polymer ($A_H'$-6), 1.5 parts by mass of maleic anhydride and 0.1 parts by mass of di-t-butyl peroxide (manufactured by NOF CORPORATION) were added, and a reaction was caused to proceed at 160° C. for 4 hours to obtain a maleic anhydride-modified hydrogenated liquid polyisoprene (A*-7) (hereafter also referred to as a "polymer (A*-7)"). The conversion of the maleic anhydride was 99%, and the amount of maleic anhydride added to the polymer (A*-7) was 1.5 parts by mass relative to 100 parts by mass of the polymer (A*-7). Furthermore, 1.0 molar equivalent of 2-hydroxyethyl methacrylate relative to the added maleic anhydride was added to the polymer (A*-7). After light shielding, a reaction was caused to proceed at 120° C. for 10 hours to synthesize a methacryloyl group-modified hydrogenated liquid polyisoprene (A-9). Table 1 shows the physical properties of the synthesized methacryloyl group-modified hydrogenated liquid polyisoprene (A-9).

Production Example 10

Methacryloyl Group-modified Partially Hydrogenated Liquid Polyisoprene (A-10)

Isoprene was subjected to anionic polymerization in n-hexane using n-butyllithium as an initiator to obtain a liquid polyisoprene (hereafter also referred to as a "polymer (A'-5)") having a number-average molecular weight of 20,000. In a 10 L autoclave, 3,000 g of the polymer (A'-5) and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $5.0 \times 10^{-5}$ times the number of moles of all unsaturated bonds in the polymer (A'-1), and the temperature was increased to 80° C. A reaction was caused to proceed under stirring for 7 hours while hydrogen was supplied as needed so that the hydrogen pressure was kept at 0.5 MPa. Thus, a partially hydrogenated liquid polyisoprene (hereafter also referred to as a "polymer ($A_H$'-10)") was obtained. A part of the reaction liquid was taken and the polymer ($A_H$'-10) was analyzed by $^1$H-NMR. Consequently, 80% of the isoprene unit was hydrogenated. To 100 parts by mass of the purified polymer ($A_H$'-10), 1.8 parts by mass of maleic anhydride was added and a reaction was caused to proceed at 170° C. for 15 hours. Then, 0.05 parts by mass of di-t-butyl peroxide was added to the polymer ($A_H$'-10) and a reaction was further caused to proceed at 170° C. for 5 hours to obtain a maleic anhydride-modified partially hydrogenated liquid polyisoprene (A*-8) (hereafter also referred to as a "polymer (A*-8)"). The conversion of the maleic anhydride was 99%, and the amount of maleic anhydride added to the polymer (A*-8) was 1.8 parts by mass relative to 100 parts by mass of the polymer (A*-8). Furthermore, 1.0 molar equivalent of 2-hydroxyethyl methacrylate relative to the added maleic anhydride was added to the polymer (A*-8). After light shielding, a reaction was caused to proceed at 120° C. for 10 hours to synthesize a methacryloyl group-modified partially hydrogenated liquid polyisoprene (A-10). Table 1 shows the physical properties of the synthesized methacryloyl group-modified partially hydrogenated liquid polyisoprene (A-10).

Production Example 11

Methacryloyl Group-modified Partially Hydrogenated Liquid Polyisoprene (A-11)

To 100 parts by mass of the polymer ($A_H$'-10) obtained in Production Example 10, 3.0 parts by mass of maleic anhydride was added and a reaction was caused to proceed at 170° C. for 15 hours. Then, 0.05 parts by mass of di-t-butyl peroxide was added to the polymer ($A_H$'-10) and a reaction was caused to proceed at 170° C. for 5 hours to obtain a maleic anhydride-modified partially hydrogenated liquid polyisoprene (A*-9) (hereafter also referred to as a "polymer (A*-9)"). The conversion of the maleic anhydride was 99%, and the amount of maleic anhydride added to the polymer (A*-9) was 3.0 parts by mass relative to 100 parts by mass of the polymer (A*-9). Furthermore, 0.33 molar equivalents of 2-hydroxyethyl methacrylate and 0.67 molar equivalents of 3-methyl-1,3-butanediol relative to the added maleic anhydride were added to the polymer (A*-9). After light shielding, a reaction was caused to proceed at 120° C. for 10 hours to synthesize a methacryloyl group-modified partially hydrogenated liquid polyisoprene (A-11). Table 1 shows the physical properties of the synthesized methacryloyl group-modified partially hydrogenated liquid polyisoprene (A-11).

Production Example 12

Methacryloyl Group-modified Partially Hydrogenated Liquid Polyisoprene (A-12)

In a 10 L autoclave, 3,000 g of the polymer (A'-5) obtained in Production Example 10 and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $7.5 \times 10^{-5}$ times the number of moles of all unsaturated bonds in the polymer (A'-1), and the temperature was increased to 80° C. A reaction was caused to proceed under stirring for 7 hours while hydrogen was supplied as needed so that the hydrogen pressure was kept at 0.5 MPa. Thus, a partially hydrogenated liquid polyisoprene (hereafter also referred to as a "polymer ($A_H$'-11)") was obtained. A part of the reaction liquid was taken and the polymer ($A_H$'-11) was analyzed by $^1$H-NMR. Consequently, 88% of the isoprene unit was hydrogenated. To 100 parts by mass of the purified polymer ($A_H$'-11), 3.0 parts by mass of maleic anhydride was added and a reaction was caused to proceed at 170° C. for 15 hours. Then, 0.05 parts by mass of di-t-butyl peroxide was added to the polymer ($A_H$'-11) and a reaction was caused to proceed at 170° C. for 5 hours to obtain a maleic anhydride-modified partially hydrogenated liquid polyisoprene (A*-10) (hereafter also referred to as a "polymer (A*-10)"). The conversion of the maleic anhydride was 97%, and the amount of maleic anhydride added to the polymer (A*-10) was 2.9 parts by mass relative to 100 parts by mass of the polymer (A*-10). Furthermore, 0.33 molar equivalents of 2-hydroxyethyl methacrylate and 0.67 molar equivalents of 3-methyl-1,3-butanediol relative to the added maleic anhydride were added to the polymer (A*-10). After light shielding, a reaction was caused to proceed at 120° C. for 10 hours to synthesize a methacryloyl group-modified partially hydrogenated liquid polyisoprene (A-12). Table 1 shows the physical properties of the synthesized methacryloyl group-modified partially hydrogenated liquid polyisoprene (A-12).

Production Example 13

Methacryloyl Group-modified Partially Hydrogenated Liquid Polyisoprene (A-13)

Isoprene was subjected to anionic polymerization in n-hexane using n-butyllithium as an initiator to obtain a liquid polyisoprene (hereafter also referred to as a "polymer (A'-6)") having a number-average molecular weight of 11,000. In a 10 L autoclave, 3,000 g of the polymer (A'-6) and 3,000 g of cyclohexane serving as a solvent were mixed with each other and the temperature was increased to 50° C. Subsequently, a mixture of triisobutylaluminum and nickel 2-ethylhexanoate at a molar ratio of 3:1 was added as a hydrogenation catalyst so that the number of moles of nickel metal constituting the hydrogenation catalyst was $7.5 \times 10^{-5}$ times the number of moles of all unsaturated bonds in the polymer (A'-6), and the temperature was increased to 80° C. A reaction was caused to proceed under stirring for 7 hours while hydrogen was supplied as needed so that the hydrogen pressure was kept at 0.5 MPa. Thus, a partially hydrogenated liquid polyisoprene (hereafter also referred to as a "polymer ($A_H$'-12)") was obtained. A part of the reaction liquid was taken and the polymer ($A_H$'-12) was analyzed by $^1$H-NMR. Consequently, 90% of the isoprene unit was hydrogenated. To 100 parts by mass of the purified polymer ($A_H$'-12), 4.0 parts by mass of maleic anhydride was added and a reaction was caused to proceed at 170° C. for 15 hours. Then, 0.05 parts by mass of di-t-butyl peroxide was added to the polymer ($A_H$'-12) and a reaction was further caused to proceed at 170° C. for 5 hours to obtain a maleic anhydride-modified partially hydrogenated liquid polyisoprene (A*-11) (hereafter also referred to as a "polymer (A*-11)"). The conversion of the maleic anhydride was 96%, and the amount of maleic anhydride added to the polymer (A*-11) was 3.8 parts by mass relative to 100 parts by mass of the polymer (A*-11). Furthermore, 0.5 molar equivalents of 2-hydroxyethyl methacrylate and 0.5 molar equivalents of 3-methyl-1,3-butanediol relative to the added maleic anhydride were added to the polymer (A*-11). After light shielding, a reaction was caused to proceed at 120° C. for 10 hours to synthesize a methacryloyl group-modified partially hydrogenated liquid polyisoprene (A-13). Table 1 shows the physical properties of the synthesized methacryloyl group-modified partially hydrogenated liquid polyisoprene (A-13).

The physical properties of the (meth)acryloyl group-modified liquid polyisoprenes (A-1) to (A-13) obtained in Production Examples were measured as follows.

(Method for Measuring Number-Average Molecular Weight (Mn))

Mn of the (meth)acryloyl group-modified liquid polyisoprenes and polybutadiene obtained in Production Examples was determined by GPC (gel permeation chromatography) as a molecular weight in terms of standard polystyrene. The instrument and conditions for the measurement are as follows.

Instrument: GPC Instrument "GPC8020" manufactured by Tosoh Corporation
Separation column: "TSKgel G4000HXL" manufactured by Tosoh Corporation
Detector: "RI-8020" manufactured by Tosoh Corporation
Eluent: tetrahydrofuran
Eluent flow rate: 1.0 ml/min
Sample concentration: 5 mg/10 ml
Column temperature: 40° C.

(Hydrogenation Rate)

The hydrogenation rate was measured using a $^1$H-NMR (500 MHz) manufactured by JEOL Ltd. under the following conditions. The concentration was sample/deuterochloroform=100 mg/1 mL, the number of acquisitions was 512, and the measurement temperature was 50° C. The hydrogenation rate was calculated from the area ratio between a peak derived from a double bond derived from a non-hydrogenated conjugated diene compound and a peak derived from a saturated hydrocarbon derived from a hydrogenated or non-hydrogenated conjugated diene compound in the obtained spectrum.

(Functional Group Equivalent Weight)

The functional group equivalent weight was measured using a $^1$H-NMR (500 MHz) manufactured by JEOL Ltd. under the following conditions. The concentration was sample/deuterochloroform=100 mg/1 mL, the number of acquisitions was 512, and the measurement temperature was 50° C. The functional group equivalent weight of the modifying group (p) was calculated from the hydrogenation rate determined by the above method and the area ratio between a peak derived from a double bond of the (meth)acryloyl group in the modifying group (p) and a peak derived from a carbon-carbon double bond on the polymer main chain in the obtained spectrum.

The functional group equivalent weight of the modifying group (q) relative to the polymer weight was calculated from the hydrogenation rate determined by the above method and the area ratio between a peak derived from a methylene group adjacent to an oxygen atom in the modifying group (q) and a peak derived from a carbon-carbon double bond on the polymer main chain in the obtained spectrum.

(Melt Viscosity)

The melt viscosities at 38° C. of the (meth)acryloyl group-modified liquid polyisoprenes and polybutadiene obtained in Production Examples were measured with a Brookfield (B type) viscometer (manufactured by BROOKFIELD ENGINEERING LABS. INC.).

(Vinyl Content)

The liquid diene rubbers (A'-1) to (A'-6) before the hydrogenation reaction were measured using a $^1$H-NMR (500 MHz) manufactured by JEOL Ltd. under the following conditions. The concentration was sample/deuterochloroform=100 mg/1 mL, the number of acquisitions was 512, and the measurement temperature was 50° C. The vinyl content was calculated from the area ratio between a peak of a double bond derived from a vinylated conjugated diene compound and a peak of a double bond derived from a non-vinylated conjugated diene compound in the obtained spectrum.

(Glass Transition Temperature)

Ten milligrams of the (meth)acryloyl group-modified liquid polyisoprenes and polybutadiene obtained in Production Examples were placed on an aluminum pan. A thermogram was made by differential scanning calorimetry (DSC) at a heating rate of 10° C./min. A value at the peak top of DDSC was defined as a glass transition temperature.

(Amount of HEMA Compatible with 100 Parts by Mass of Resin)

An arbitrary amount of 2-hydroxyethyl methacrylate (HEMA) serving as a polar monomer was added to 5 g of the (meth)acryloyl group-modified liquid polyisoprenes and polybutadiene obtained in Production Examples. The mixture was thoroughly stirred at 50° C. to make the mixture homogeneous and then left to stand at room temperature for 3 hours, and a change in the appearance was observed. When the mixture was transparent without causing separation and cloudiness, the components were judged to be compatible with each other. The maximum amount (parts by mass) of HEMA compatible with 100 parts by mass of the modified liquid polyisoprene was determined.

TABLE 1

| Modified liquid diene rubber (A) | Monomer unit (a1) | Modifying compound (p', q') | Mn | Hydrogenation rate (%) | Equivalent weight of modifying group (p) (g/eq) | Equivalent weight of modifying group (q) (g/eq) | Melt viscosity (P · s at 38° C.) | Vinyl content (mol %) | Amount of HEMA compatible with 100 parts by mass of resin (parts by mass) | Glass transition temperature (° C.) |
|---|---|---|---|---|---|---|---|---|---|---|
| Production Example 1 (A-1) | Isoprene | HEMA | 32,500 | 81 | 8,700 | — | 2700 | 7 | 3 | −56 |
| Production Example 2 (A-2) | Isoprene | HEA | 32,500 | 81 | 9,000 | — | 4500 | 7 | 3 | −56 |
| Production Example 3 (A-3) | Isoprene | 701A | 33,200 | 81 | 8,600 | — | 4800 | 7 | 3 | −56 |

TABLE 1-continued

| Modified liquid diene rubber (A) | Monomer unit (a1) | Modifying compound (p', q') | Mn | Hydrogenation rate (%) | Equivalent weight of modifying group (p) (g/eq) | Equivalent weight of modifying group (q) (g/eq) | Melt viscosity (P·s at 38° C.) | Vinyl content (mol %) | Amount of HEMA compatible with 100 parts by mass of resin (parts by mass) | Glass transition temperature (° C.) |
|---|---|---|---|---|---|---|---|---|---|---|
| Production Example 4 (A-4) | Isoprene | HEMA | 23,000 | 73 | 8,800 | — | 311 | 7 | 3 | −56 |
| Production Example 5 (A-5) | Isoprene | HEMA | 35,700 | 54 | 8,600 | — | 1760 | 7 | 3 | −57 |
| Production Example 6 (A-6) | Butadiene | HEMA | 9,200 | 80 | 6,800 | — | 27 | 55 | 3 | −55 |
| Production Example 7 (A-7) | Isoprene | HEMA | 10,000 | 99 | 6,700 | — | 60 | 7 | 3 | −55 |
| Production Example 8 (A-8) | Isoprene | HEMA | 20,300 | 0 | 9,100 | — | 22 | 7 | 3 | −60 |
| Production Example 9 (A-9) | Isoprene | HEMA | 33,000 | 99 | 6,700 | — | 3500 | 7 | 3 | −54 |
| Production Example 10 (A-10) | Isoprene | HEMA | 23,200 | 80 | 10,000 | — | 535 | 7 | 3 | −59 |
| Production Example 11 (A-11) | Isoprene | HEMA, IPG | 25,000 | 80 | 14,900 | 5,200 | 3240 | 7 | 8 | −56 |
| Production Example 12 (A-12) | Isoprene | HEMA, IPG | 25,600 | 88 | 14,900 | 5,200 | 3370 | 7 | 7 | −58 |
| Production Example 13 (A-13) | Isoprene | HEMA, IPG | 14,400 | 90 | 8,500 | 7,800 | 353 | 7 | 9 | −57 |

HEMA: 2-hydroxyethyl methacrylate
HEA: 2-hydroxyethyl acrylate
701A: 2-hydroxy-3-acryloyloxypropyl methacrylate
IPG: 3-methyl-1,3-butanediol Examples 1, 4 to 7, 9, 13, 14, 15, and 16

The (meth)acryloyl group-modified partially hydrogenated liquid diene rubbers (A-1) to (A-6) and (A-10) to (A-13) and the radical polymerization initiator (B-1) were inserted into a 300 mL stainless container at ratios listed in Table 2 and mixed with each other using an impeller at room temperature for 20 minutes to prepare 200 g of resin compositions. The resulting resin compositions were evaluated by the methods below. Table 2 shows the results.

Comparative Examples 1, 3, and 4

Resin compositions were prepared and evaluated in the same manner as in Example 1, except that the (meth)acryloyl group-modified liquid polyisoprenes (A-7) to (A-9) and the radical polymerization initiator (B-1) were mixed with each other at ratios listed in Table 2. Table 2 shows the results.

Examples 2, 3, 8, 10, 11, and 12

Resin compositions were prepared and evaluated in the same manner as in Example 1, except that the methacryloyl group-modified partially hydrogenated liquid polyisoprenes (A-1) and (A-10), the methacryloyl group-modified partially hydrogenated liquid polybutadiene (A-6), the radical polymerization initiator (B-1), the radically polymerizable monomers (C-1) and (C-2) having a carbon-carbon double bond, and the hydrogenated liquid diene rubbers (D-1) and (D-2) not containing a (meth)acryloyl group were mixed with each other at ratios listed in Table 2. Table 2 shows the results.

Comparative Example 2

A resin composition was prepared and evaluated in the same manner as in Example 1, except that the methacryloyl group-modified hydrogenated liquid polyisoprene (A-7), the radical polymerization initiator (B-1), and the radically polymerizable monomer (C-1) having a carbon-carbon double bond were mixed with each other at a ratio listed in Table 2. Table 2 shows the results.

Comparative Example 5

The methacryloyl group-modified hydrogenated liquid polyisoprene (A-7), the radical polymerization initiator (B-1), and the radically polymerizable monomer (C-1) having a carbon-carbon double bond were inserted into a 300 mL stainless container at a ratio listed in Table 2 and mixed with each other using an impeller at 50° C. for 20 minutes to prepare 200 g of a resin composition. The resulting resin composition was evaluated by the methods below. Table 2 shows the results.

The physical properties were evaluated as follows. In Table 2, "N/D" refers to "unmeasureable because a cured product was not obtained".

(Appearance)

The resin composition obtained in each of Examples and Comparative Examples was injected into a mold having a length of 70 mm, a width of 70 mm, and a thickness of 0.5 mm. The surface of the composition was covered with a PET film having a thickness of 50 μm. Then, UV irradiation was performed using a UV irradiation apparatus (manufactured by GS Yuasa Corporation, HAK 125L-F was used as a mercury lamp) under the conditions of an irradiation intensity of 45 mW/cm$^2$, a conveyer speed of 0.25 m/min, and a dose of 1,000 mJ/cm$^2$ per operation. This operation was repeatedly performed three times to obtain a cured product. The PET film was peeled off from the cured product, and then the cured product was visually observed. The transparency was evaluated on the basis of the following criteria.

<Evaluation Criteria>
5: The cured product is colorless and transparent.
4: The cured product is transparent though very slight coloring is observed.
3: The cured product is transparent though slight coloring is observed.
2: The cured product is transparent though apparent coloring is observed.
1: The cured product is opaque.
N/D: Unmeasureable because a cured product is not obtained
(Hardness)
The resin composition obtained in each of Examples and Comparative Examples was injected into a mold having a length of 70 mm, a width of 35 mm, and a thickness of 2.0 mm. The surface of the composition was covered with a PET film having a thickness of 50 μm. Then, UV irradiation was performed using a UV irradiation apparatus (manufactured by GS Yuasa Corporation, HAK 125L-F was used as a mercury lamp) under the conditions of an irradiation intensity of 45 mW/cm$^2$, a conveyer speed of 0.25 m/min, and a dose of 1,000 mJ/cm$^2$ per operation. This operation was repeatedly performed three times to obtain a cured product. Three of the resulting films having a thickness of 2.0 mm were stacked on top of one another to obtain a sample having a thickness of 6.0 mm. The hardness of the sample was measured in conformity with JIS K 6253.
(Breaking Strength and Tensile Elongation)
A strip specimen having a width of 6 mm and a length of 70 mm was punched out from the cured product obtained in the observation of appearance. The specimen was subjected to a tensile test using a tensile tester manufactured by Instron at a crosshead speed of 50 mm/min to determine the breaking strength and the tensile elongation. The higher the measured values, the better the breaking strength and the tensile elongation.
(UV Irradiation Dose Required for Curing)
The dynamic viscoelasticity of the resin composition obtained in each of Examples and Comparative Examples was measured using a rotational rheometer (product name: ARES-G2, manufactured by TA Instruments Japan, Omni-Cure SERIES 2000 was used as a high-pressure mercury lamp) by applying shearing stress at a measurement temperature of 25° C. at a strain of 1% at an angular velocity of 10 rad/s while UV irradiation was performed at a UV irradiation intensity of 40 mW/cm$^2$ for 100 seconds so that the total irradiation dose reached 4,000 mJ/cm$^2$. Herein, the UV irradiation dose required until the storage modulus reached a storage modulus $G_{90}'$, which was 90% of the storage modulus $G_{max}'$ obtained after the UV irradiation at a dose of 4,000 mJ/cm$^2$, was defined as a UV irradiation dose required for curing. The smaller the UV irradiation dose required for curing, the higher the curing rate.
(Thermal Stability)
The same cured product as that used in the observation of appearance was heated in the air at 100° C. for 12 hours. A change (ΔYI) in YI before and after the test was measured with a color-difference meter (product name: ND-300A, manufactured by NIPPON DENSHOKU INDUSTRIES CO., LTD.). The thermal stability improves as ΔYI decreases. The thermal stability was evaluated on the basis of the following criteria.
<Evaluation Criteria>
5: ΔYI<2
4: 2≤ΔYI<4
3: 4≤ΔYI<6
2: 6≤ΔYI<8
1: 8≤ΔYI

TABLE 2

|  |  |  | Example |  |  |  |  |  |  |  |  |  |  |
|---|---|---|---|---|---|---|---|---|---|---|---|---|---|
|  |  |  | 1 | 2 | 3 | 4 | 5 | 6 | 7 | 8 | 9 | 10 | 11 |
| Formulation (parts by mass) | Modified liquid diene rubber (A) | (A-1) | 100 | 90 | 70 |  |  |  |  |  |  |  |  |
|  |  | (A-2) |  |  |  | 100 |  |  |  |  |  |  |  |
|  |  | (A-3) |  |  |  |  | 100 |  |  |  |  |  |  |
|  |  | (A-4) |  |  |  |  |  | 100 |  |  |  |  |  |
|  |  | (A-5) |  |  |  |  |  |  | 100 |  |  |  |  |
|  |  | (A-6) |  |  |  |  |  |  |  | 70 |  |  |  |
|  |  | (A-7) |  |  |  |  |  |  |  |  |  |  |  |
|  |  | (A-8) |  |  |  |  |  |  |  |  |  |  |  |
|  |  | (A-9) |  |  |  |  |  |  |  |  |  |  |  |
|  |  | (A-10) |  |  |  |  |  |  |  |  | 100 | 70 | 35 |
|  |  | (A-11) |  |  |  |  |  |  |  |  |  |  |  |
|  |  | (A-12) |  |  |  |  |  |  |  |  |  |  |  |
|  |  | (A-13) |  |  |  |  |  |  |  |  |  |  |  |
|  | Monomer (C) | (C-1) |  | 10 | 30 |  |  |  |  |  |  |  |  |
|  |  | (C-2) |  |  |  |  |  |  |  | 30 |  | 30 | 30 |
|  | Unmodified liquid diene rubber (D) | (D-1) |  |  |  |  |  |  |  |  |  |  | 35 |
|  |  | (D-2) |  |  |  |  |  |  |  |  |  |  |  |
|  | Radical polymerization initiator (B) | (B-1) | 3 | 3 | 3 | 3 | 3 | 3 | 3 | 3 | 3 | 3 | 3 |
|  | Content of radical polymerization initiator (B) (mass %) |  | 2.9 | 2.9 | 2.9 | 2.9 | 2.9 | 2.9 | 2.9 | 2.9 | 2.9 | 2.9 | 2.9 |
|  | Mass ratio [(A)/(C)] |  |  | 9.0 | 2.3 |  |  |  |  | 2.3 |  | 2.3 | 1.2 |
| Physical properties | Appearance |  | 4 | 5 | 5 | 4 | 4 | 4 | 5 | 4 | 5 | 5 | 5 |
|  | Hardness (JIS A) |  | 24 | 25 | 37 | 21 | 24 | 13 | 23 | 17 | 8 | 22 | 11 |
|  | Breaking strength (MPa) |  | 0.6 | 0.4 | 0.8 | 0.4 | 0.5 | 0.2 | 0.5 | 0.5 | 0.2 | 0.7 | 1.0 |
|  | Tensile elongation (%) |  | 123 | 112 | 136 | 107 | 105 | 85 | 93 | 112 | 81 | 135 | 194 |
|  | UV irradiation dose required for curing (mJ/cm$^2$) |  | 480 | 720 | 1320 | 1740 | 1440 | 870 | 1520 | 2870 | 850 | 2890 | 3030 |
|  | Thermal stability |  | 5 | 5 | 5 | 5 | 5 | 5 | 4 | 5 | 5 | 5 | 5 |

TABLE 2-continued

|  |  |  | Example |  |  |  |  | Comparative Example |  |  |  |  |
|---|---|---|---|---|---|---|---|---|---|---|---|---|
|  |  |  | 12 | 13 | 14 | 15 | 16 | 1 | 2 | 3 | 4 | 5 |
| Formulation (parts by mass) | Modified liquid diene rubber (A) | (A-1) |  |  |  |  |  |  |  |  |  |  |
|  |  | (A-2) |  |  |  |  |  |  |  |  |  |  |
|  |  | (A-3) |  |  |  |  |  |  |  |  |  |  |
|  |  | (A-4) |  |  |  |  |  |  |  |  |  |  |
|  |  | (A-5) |  |  |  |  |  |  |  |  |  |  |
|  |  | (A-6) |  |  |  |  | 100 |  |  |  |  |  |
|  |  | (A-7) |  |  |  |  |  | 100 | 70 |  |  | 70 |
|  |  | (A-8) |  |  |  |  |  |  |  | 100 |  |  |
|  |  | (A-9) |  |  |  |  |  |  |  |  | 100 |  |
|  |  | (A-10) | 35 |  |  |  |  |  |  |  |  |  |
|  |  | (A-11) |  | 100 |  |  |  |  |  |  |  |  |
|  |  | (A-12) |  |  | 100 |  |  |  |  |  |  |  |
|  |  | (A-13) |  |  |  | 100 |  |  |  |  |  |  |
|  | Monomer (C) | (C-1) |  |  |  |  |  |  | 30 |  |  | 30 |
|  |  | (C-2) | 30 |  |  |  |  |  |  |  |  |  |
|  | Unmodified liquid diene rubber (D) | (D-1) |  |  |  |  |  |  |  |  |  |  |
|  |  | (D-2) | 35 |  |  |  |  |  |  |  |  |  |
|  | Radical polymerization initiator (B) | (B-1) | 3 | 3 | 3 | 3 | 3 | 3 | 3 | 3 | 3 | 3 |
|  | Content of radical polymerization initiator (B) (mass %) |  | 2.9 | 2.9 | 2.9 | 2.9 | 2.9 | 2.9 | 2.9 | 2.9 | 2.9 | 2.9 |
|  | Mass ratio [(A)/(C)] |  | 1.2 |  |  |  |  |  | 2.3 |  |  | 2.3 |
| Physical properties | Appearance |  | 5 | 5 | 5 | 5 | 5 | N/D | N/D | 5 | N/D | 1 |
|  | Hardness (JIS A) |  | 11 | 6 | 6 | 8 | <5 | N/D | N/D | <5 | N/D | 28 |
|  | Breaking strength (MPa) |  | 0.7 | 0.2 | 0.3 | 0.1 | <0.1 | N/D | N/D | <0.1 | N/D | 1.1 |
|  | Tensile elongation (%) |  | 186 | 130 | 169 | 81 | unmeasureable | N/D | N/D | 45 | N/D | 82 |
|  | UV irradiation dose required for curing (mJ/cm$^2$) |  | 2890 | 720 | 700 | 790 | 1500 | N/D | N/D | 3400 | N/D | 3000 |
|  | Thermal stability |  | 5 | 4 | 4 | 4 | 5 | N/D | N/D | 2 | N/D | 5 |

As is clear from Examples 1 to 16, the (meth)acryloyl group-modified partially hydrogenated liquid diene rubber in which the hydrogenation rate and the functional group equivalent weight of the modifying group (p) are within the scope of the present invention demands only a small UV irradiation dose required for curing and thus has a high curing rate. Furthermore, the resulting cured product is excellent in terms of flexibility, breaking strength, and tensile elongation and also has high transparency and high thermal stability. It is also found from Examples 2, 3, 8, 10, 11, and 12 that even when the monomer (C) is contained, a high curing rate is achieved and a cured product having high transparency is obtained. Furthermore, the comparison between Example 10 and Example 11 or 12 shows that the tensile elongation is considerably improved by adding a liquid diene rubber not containing a (meth)acryloyl group, and a cured product having a particularly high flexibility is obtained. As is clear from Example 16, when the (meth)acryloyl group-modified partially hydrogenated liquid diene rubber has a number-average molecular weight of less than 10,000, a high curing rate is achieved and high transparency and thermal stability are achieved after curing, but a cured product of the (meth)acryloyl group-modified partially hydrogenated liquid diene rubber alone sometimes has a low breaking strength. However, as is clear from Example 8, the breaking strength and tensile elongation after curing are improved by adding other components such as the monomer (C) to the (meth)acryloyl group-modified partially hydrogenated liquid diene rubber, and a cured product having sufficiently high mechanical strength and stretchability is obtained. Moreover, the comparison between Example 9 and Example 13 or 14 shows that, by adding the modifying group (q) to the (meth)acryloyl group-modified partially hydrogenated liquid diene rubber, the tensile elongation of a cured product can be improved while the curing rate and the transparency and thermal stability after curing are maintained. On the other hand, as is clear from Comparative Example 3, when a non-hydrogenated modified liquid diene rubber was used, a large UV irradiation dose was required for curing and thus the curing rate was low. Therefore, a cured product having good mechanical properties was not obtained. As is clear from Comparative Examples 1 and 4, in the case where a modified liquid diene rubber in which the hydrogenation rate exceeds the scope of the present invention was used, a cured product was not obtained. Moreover, as is clear from Comparative Example 2, in the case where a modified liquid diene rubber in which the hydrogenation rate exceeds the scope of the present invention was used, even if the monomer (C) was contained, the compatibility with the monomer (C) was low and a cured product was not obtained. In Comparative Example 5, when the same composition as that in Comparative Example 2 was prepared, poor mixing was addressed by increasing the kneading temperature, and a cured product was prepared. However, the components were not completely compatible with each other, and the sample before and after curing was cloudy.

The (meth)acryloyl group-modified partially hydrogenated liquid diene rubbers in Examples 13 to 15 have the modifying group (q) in addition to the modifying group (p). Therefore, the compatibility with a polar compound (e.g., highly polar monomer) is expected to be improved. The cured products obtained in Examples 13 to 15 have a relatively low hardness and a relatively high tensile elongation. Therefore, when the (meth)acryloyl group-modified partially hydrogenated liquid diene rubber has the modifying group (q) in addition to the modifying group (p), it is expected that high flexibility is achieved and the compatibility with a polar compound is improved, and a cured product having high flexibility is obtained.

The invention claimed is:

1. A modified liquid diene rubber, comprising a modifying group (p) and a monomer unit (a1) derived from a conjugated diene compound,
wherein a carbon-carbon double bond derived from the conjugated diene compound has a hydrogenation rate of 30 to 95 mol%,
the modifying group (p) comprises at least one structure selected from the group consisting of (p1), (p1'), (p2) and (p2'),
and a functional group equivalent weight of the modifying group (p) is from 700 to 20,000 g/eq:

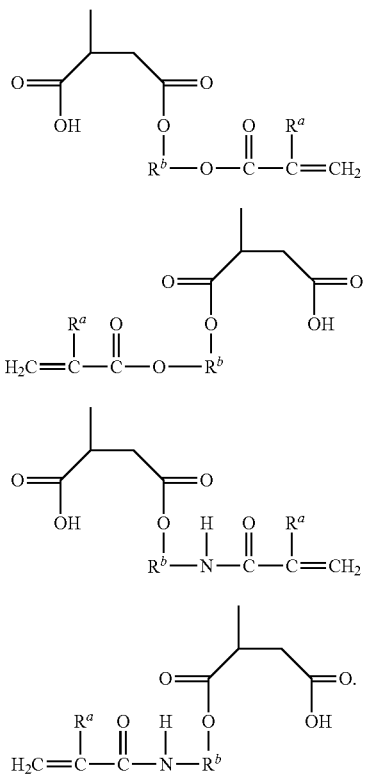

wherein $R^a$ represents a hydrogen atom or a methyl group and $R^b$ represents an alkylene group comprising 1 to 10 carbons or a polyalkylene glycol group, $\{-(CH2)_n-O\}_m-$, wherein n is 1 to 10 and m is 1 to 5.

2. The modified liquid diene rubber according to claim 1, having a number-average molecular weight of 1,000 to 80,000.

3. The modified liquid diene rubber according to claim 1, having a melt viscosity of 0.1 to 5,000 Pa·s at 38° C.

4. The modified liquid diene rubber according to claim 1, wherein the modifying group (p) bonds to a polymer main chain.

5. A resin composition, comprising a modified liquid diene rubber (A) and a radical polymerization initiator (B), wherein
a content of the radical polymerization initiator (B) is from 0.1 to 20 mass % relative to a total amount of the resin composition,
the modified liquid diene rubber (A) comprises a modifying group (p) having at least one stricture selected from the group consisting of (p1), (p1'), (p2) and (p2'), and
a monomer unit (a1) derived from a conjugated diene compound,
a carbon-carbon double bond derived from the conjugated diene compound has a hydrogenation rate of 30 to 95 mol %, and
a functional group equivalent weight of the modifying group (p) is from 700 to 20,000 g/eq:

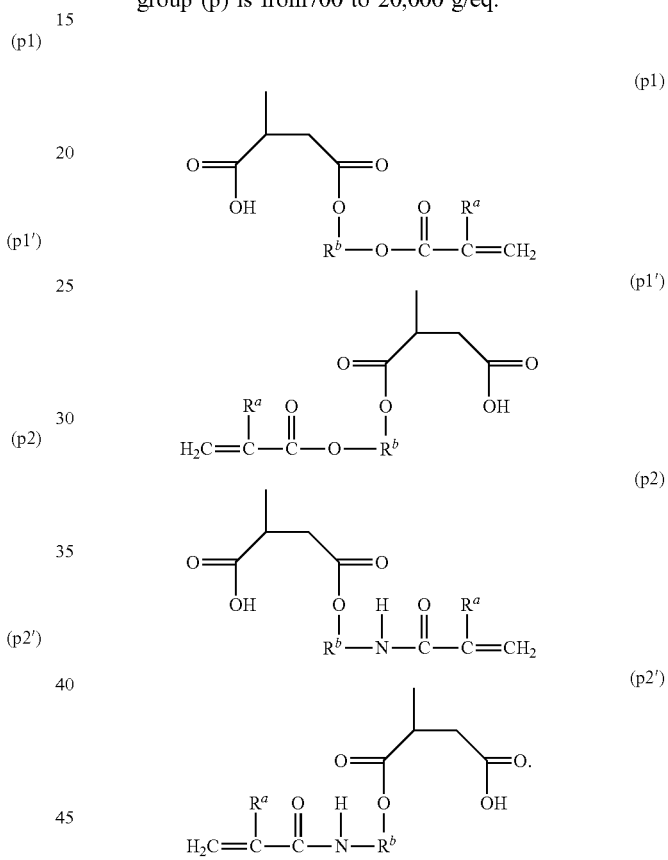

wherein $R^a$ represents a hydrogen atom or a methyl group and $R^b$ represents an alkylene group comprising 1 to 10 carbons or a polyalkylene glycol group, $\{-(CH2)_n-O\}_m-$, wherein n is 1 to 10 and m is 1 to 5.

6. The resin composition according to claim 5, further comprising a radically polymerizable monomer (C) having a carbon-carbon double bond,
wherein a mass ratio [(A)/(C)] of the modified liquid diene rubber (A) to the monomer (C) is 0.01 to 100.

7. A cured product, obtained by a process comprising curing the resin composition according to claim 5.

8. An optical adhesive, formed of the resin composition according to claim 5.

* * * * *